(12) United States Patent
Orszag et al.

(10) Patent No.: US 7,464,125 B1
(45) Date of Patent: Dec. 9, 2008

(54) CHECKING THE VALIDITY OF BLOCKS AND BACKUP DUPLICATES OF BLOCKS DURING BLOCK READS

(75) Inventors: Steven Alan Orszag, Princeton, NJ (US); Philip Eric Jackson, Princeton Junction, NJ (US); Mark Ish, Shrewsbury, NJ (US)

(73) Assignee: IBRIX Inc., Billerica, MA (US)

( * ) Notice: Subject to any disclaimer, the term of this patent is extended or adjusted under 35 U.S.C. 154(b) by 320 days.

(21) Appl. No.: 11/152,996

(22) Filed: Jun. 14, 2005

Related U.S. Application Data

(63) Continuation of application No. 11/129,514, filed on May 13, 2005, now abandoned, which is a continuation of application No. 10/122,681, filed on Apr. 15, 2002, now abandoned.

(51) Int. Cl.
*G06F 17/30* (2006.01)

(52) U.S. Cl. .................. 707/204; 707/10; 707/201; 707/203; 709/201

(58) Field of Classification Search .................. 707/1, 707/4, 5, 10, 202, 203, 204, 201; 709/201–229
See application file for complete search history.

(56) References Cited

U.S. PATENT DOCUMENTS

| | | | | |
|---|---|---|---|---|
| 4,893,307 A | * | 1/1990 | McKay et al. | 370/389 |
| 5,021,949 A | * | 6/1991 | Morten et al. | 709/231 |
| 5,504,883 A | * | 4/1996 | Coverston et al. | 707/202 |
| 5,689,706 A | * | 11/1997 | Rao et al. | 707/201 |
| 5,819,292 A | * | 10/1998 | Hitz et al. | 707/203 |
| 5,828,876 A | * | 10/1998 | Fish et al. | 707/1 |
| 5,948,062 A | * | 9/1999 | Tzelnic et al. | 709/219 |
| 5,987,506 A | * | 11/1999 | Carter et al. | 709/213 |
| 6,023,706 A | * | 2/2000 | Schmuck et al. | 707/200 |
| 6,192,408 B1 | * | 2/2001 | Vahalia et al. | 709/229 |
| 6,324,581 B1 | * | 11/2001 | Xu et al. | 709/229 |
| 6,345,244 B1 | * | 2/2002 | Clark | 704/2 |
| 6,356,863 B1 | * | 3/2002 | Sayle | 707/10 |
| 6,389,420 B1 | * | 5/2002 | Vahalia et al. | 707/8 |
| 6,453,354 B1 | * | 9/2002 | Jiang et al. | 709/229 |
| 6,493,729 B2 | * | 12/2002 | Gusler et al. | 707/200 |
| 6,782,389 B1 | * | 8/2004 | Chrin et al. | 707/10 |
| 6,823,336 B1 | * | 11/2004 | Srinivasan et al. | 707/8 |

OTHER PUBLICATIONS

Polyzois, C.A., and Garcia-Molina, H., "Processing of Read-Only Queries at a Remote Backup," Proceedings of the 13th Symposium on Reliable Distributed Systems, Oct. 25-27, 1994, Dana Point, CA, IEEE Computer Society Press, Los Alamitos, CA, pp. 192-201.*

* cited by examiner

*Primary Examiner*—Shahid A Alam
(74) *Attorney, Agent, or Firm*—Townsend and Townsend and Crew LLP

(57) ABSTRACT

File system coherency of a file system, particularly for system blocks, may be maintained by (i) duplicating and verifying the (system) blocks, (ii) writing (system) blocks as a sequence of atomic commands so that at any given time, there is a valid (system) block on a physical storage device, and/or (iii) defining the file system directory data structure with directory blocks, each of the directory blocks having at least one of a directory entry and a pointer, where updates to the directory data structure are performed atomically.

21 Claims, 17 Drawing Sheets

CHECKING THE VALIDITY OF BLOCKS AND BACKUP DUPLICATES OF BLOCKS DURING BLOCK READS

CROSS-REFERENCE TO RELATED ACTIONS

This application is a Continuation of U.S. patent application Ser. No. 11/129,514, filed on May 13, 2005 now abandoned, which is a Continuation of U.S. patent application Ser. No. 10/122,681, filed Apr. 15, 2002 now abandoned, that are both incorporated herein by reference.

§ 1. BACKGROUND OF THE INVENTION

§ 1.1 Field of the Invention

The present invention concerns computer storage and file systems. More specifically, the present invention concerns techniques for detecting (severe) system failures in a file system and maintaining file system consistency in the event that such failures occur.

§ 1.2 Related Art

Data generated by, and for use by, computers is stored in file systems. File systems typically maintain and manage so-called "Metadata". Metadata includes (e.g., all) file system structure, but excludes the actual data (e.g., the contents of the files). For example, Metadata may define directories and subdirectories of files (e.g., normal files, directories, hard links, symbolic links, sockets, named pipes, character devices, and block devices), the top-most directory being referred to as "the root directory". So-called "file control blocks" maintain information about each file in the file system. In the UNIX operating system, a so-called "Inode" block is used as a file control block. An Inode block may include a number of Inodes. Each Inode may include mode, link count, file modification time, Inode modification time, a block list (e.g., disk block numbers of the file that the Inode describes), etc. Such information typically does not include the name of the file. Rather, the directories and subdirectories include the file names, and map such names to the corresponding Inodes blocks (or some other file control block). As can be appreciated from the foregoing, to "get to" a file, the file system has to go through what may be an arbitrarily long chain of directory and Inode block (or some other file control block) references. As can be appreciated from the foregoing, a file system "maps" a logical file system onto the physical storage device(s).

File systems are typically maintained on so-called "secondary storage". While "main memory" is typically volatile and relatively small, secondary storage is larger and non-volatile (e.g., contents persist through power failures and system reboots). Typically, magnetic and/or optical disk-based storage devices are used for secondary storage, while RAM is used for main memory.

Errors in the file system can be introduced through a number of ways. For example, a "bad spot" can occur on a storage medium (e.g., disk) used for secondary storage, for a number of reasons, none of which is particularly relevant. Such a "bad spot" can corrupt data in a file. While corrupted files of data are certainly undesirable, if a bad spot on a disk corrupts a directory structure or Inode block (or some other file control block), an entire sub-section (e.g., a sub-tree) of the file system can become inaccessible. Sadly, many current file systems cannot withstand serious faults, such as power loss or disk failure, without significant recovery time and/or data loss.

Most of the protection provided now for file systems is designed at the hardware level, using disk or server redundancy, backup power supplies and non-volatile memory. Such solutions tend to be expensive and cannot handle some failure scenarios.

Present software-based solutions to file system corruption can be divided into two categories—namely file system check and log (or journal) replay. File system check methods read all of the system information structures on the disk for inconsistencies. Any inconsistencies discovered are repaired on a best-efforts basis. Examples of such file system check methods include FSCK in the Unix and Linux operating systems, and SCAN DISK in the Windows operating system. If there are too many problems, the file system might not be repairable. Further, the recovery times using these methods are relatively slow, and may become unacceptable as the size of file systems grows.

The log (or journal) replay systems maintain a log or journal of the latest transactions performed by the file system. Periodically, these logged transactions are archived (e.g., committed to a storage device and removed from the log). In the case of a severe failure, the transactions still in the archived log are committed, or "rolled back" after the file server is restated. These methods speed up the recovery, but can still take a long time, particularly in heavily accessed file systems. Possible corruption of the archived log (or journal) is, in itself, an additional potential catastrophic failure point.

§ 1.3 Unmet Needs

In view of the foregoing disadvantages of known ways to detect and recover from file system errors, there is a need for better techniques. Such techniques should shorten the time for, or eliminate the need for, file system recovery. Finally, such techniques should always protect critical system information.

§ 2. SUMMARY OF THE INVENTION

The present invention may provide methods, apparatus and data structures for providing a file system which meets the needs listed in § 1.3. More specifically, the present invention may be used in a distributed file system in which a block of data is stored on a first non-volatile storage and a backup duplicate of the block of data is stored on a second non-volatile storage. In accordance with the present invention, when the block of data is to be read from the first non-volatile storage, the present invention determines whether the block of data is valid. If it is determined that the block of data is not valid, then the present invention determines whether the backup duplicate of the block of data is valid. If it is determined that the backup duplicate of the block is valid, then the backup duplicate of the block of data is used to rewrite the block of data to the first non-volatile storage medium.

If it is determined that the block of data is valid, then the present invention may check the validity of the backup duplicate of the block of data. The validity check of the backup duplicate of the block of data may be done asynchronously. The validity may be determined based on a checksum, and/or based on a comparison of stamps at the start and end of the block.

The block of data is stored in a first particular part of the first non-volatile storage. The second non-volatile storage may be determined based on a mapping, in a partition control block of the first non-volatile storage, of a second particular part of the second non-volatile storage for a storing the backup duplicate of any block stored in the first particular part of the first non-volatile storage. The first non-volatile storage may be a part of a first file server and the second non-volatile storage may be part of a second file server. The first file server may be remote from the second file server.

§ 3. BRIEF DESCRIPTION OF THE DRAWINGS

§ 4. DETAILED DESCRIPTION

Figure 1:
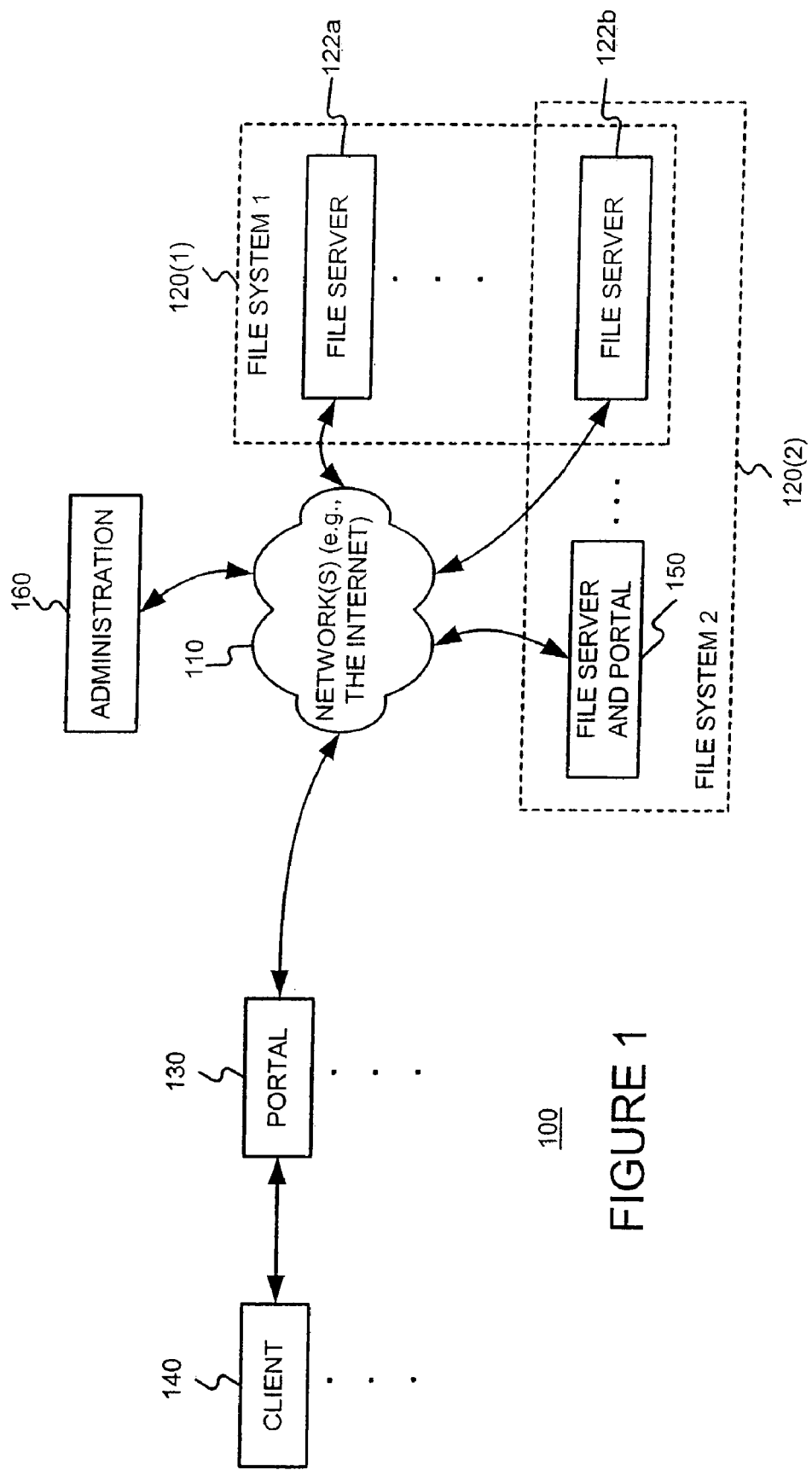
FIG. 1 is a block diagram of an exemplary distributed file system environment in which various aspects of the present invention may take place.

The present invention involves novel methods, apparatus and data structures for maintaining file system consistency, even in the event of a severe system failure. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventors regard their invention as the following disclosed methods, apparatus, articles of manufacturers, and data structures and any other patentable subject matter to the extent that they are patentable.

In the following, environments in which the present invention may be employed are introduced in § 4.1. Then, functions that may be performed by the present invention are introduced in § 4.2. Then, operations, data structures, methods and apparatus that may be used to effect those functions are described in § 4.3. Thereafter, examples of how exemplary parts of the present invention may operate is described in § 4.4. Finally, some conclusions about the present invention are set forth in § 4.5. First, however, some terms used in the specification are defined.

ATOMIC: An "atomic" operation maybe one that is a basic component of a larger operation that aggregates a number of atomic operations. An "atomic" file operation can be thought of as at the basic file system level (e.g., a command to an appropriate device driver to read and write physical blocks on a disk), or at the I/O control level (e.g., operation by device drivers and interrupt handlers to transfer information between the main memory and secondary storage). Therefore, an atomic operation has two possible states—it either happens or it doesn't.

BACKUP DUPLICATE: Refers to an instance of information. Such information may be metadata, such as a (system) block for example. A "primary copy" of a (system) block is the original system block. A first or other backup duplicate of a (system) block refer to copies, or additional instances, of the original (system) block.

BLOCK: A collection of consecutive bytes of data that are transferred between memory and a storage device (e.g., a disk) collectively, as a unit.

DIRECTORY: A file that associates file names with file control blocks (e.g., Inodes or Inode numbers). [CONFIRM] The topmost directory in a file system is commonly referred to as the "root" directory.

DISK BLOCK ADDRESS: An address that can be translated to a physical disk address by a peripheral storage interface. An example of a disk block address is a segment number, and a block number within the segment FILE: Something associated to an file control block (e.g., an INODE block), such as a collection of information (e.g., program, a set of data used by a program, or a document), a directory, devices, FIFOs, sockets, etc.

FILE CONTROL BLOCK: Metadata used to maintain the structure of a file system.

INODE: Index NODE—Associated to each file and encloses information about a file (e.g., owner, permissions, size, mode, link count, a block list of disk block numbers in the file that the Inode describes, an indirect list, Inode creation time, Inode modification time, etc.) except its name and its actual data. One can think of an Inode number as a File ID.

METADATA: Any information that is not actual data. System Blocks are an example of metadata.

PARTITION CONTROL BLOCK: An on-medium data structure that contains partition details, such as the number of blocks in a partition, size of blocks, free block count, free block pointers, etc.

SECTOR: The smallest physical storage units on a disk. They are typically of a fixed size (e.g., 512 bytes).

SEGMENT: A contiguous range of disk memory with a maximum size (e.g., 64 Gigabytes). The target size for a segment is configurable.

SUPER-BLOCK: An example of a partition control block. A data structure that holds information about a file system. In one embodiment of the present invention, each disk includes a super-block which contains a map of all segments that reside on the disk.

SYSTEM BLOCK: Blocks containing important or critical system information (e.g., Metadata). Examples of System Blocks may include Super-Blocks, File Control Blocks, Inode Blocks, Directory Blocks, and Blocks referring to file block locations (e.g., indirect pointers).

Having defined some terms used in the specification, exemplary environment in which the present invention may operate are now introduced in § 4.1 below.

§ 4.1 EXEMPLARY ENVIRONMENTS IN WHICH INVENTION MAY OPERATE

The following exemplary environments are presented to illustrate examples of utility of the present invention and to illustrate examples of contexts in which the present invention may operate. However, the present invention can be used in other environments and its use is not intended to be limited to the exemplary environments introduced here.

FIG. 1 is a block diagram of an environment 100 in which the present invention may be used. Various components are coupled with (i.e., can communicate with) a network(s) 110, such as an Internet protocol ("IP") based network. A file system 120(1), 120(2) may include one or more file servers 122. One or more portal units 130 permit one or more clients 140 to use the file system(s). The clients 140 needn't be provided with any special front-end software or application. From the perspective of a client 140, the file system 120(1), 120(2) is a virtual single storage device residing on the portal. Combined file server and portal units 150 are possible. Administration 160 of the file servers and portals may be centralized. Administrative information may be collected from the units 122, 130, 150 and distributed to such units 122, 130, 150 in a point-to-point or hierarchical manner. As shown, the environment 100 can support multiple file systems 120(1), 120(2) if desired. As illustrated, a single file server 122b may belong to/support more than one file system.

Figure 2:
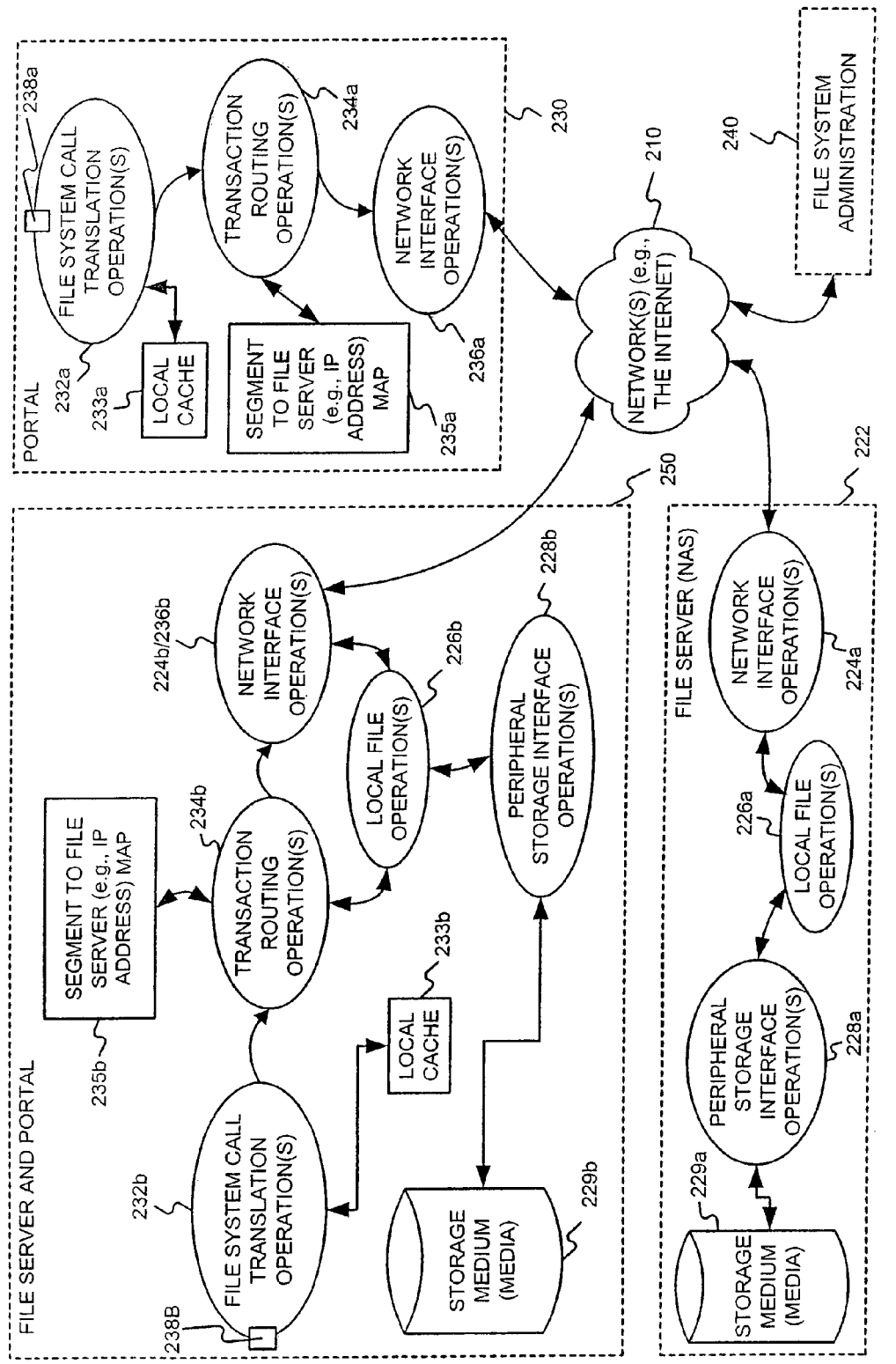
FIG. 2 is a process bubble diagram of operations that may be carried out by various exemplary apparatus used in the environment of FIG. 1.

The present invention may be used in the context of a distributed file system, such as the one described in U.S. patent application Ser. No. 09/950,555, entitled "DISTRIBUTING FILES ACROSS MULTIPLE, PERMISSIBLY HETEROGENEOUS, STORAGE DEVICES," filed on Sep. 11, 2001 and listing David Michael Chrin, Philip Eric Jackson and Steven Alan Orzag as inventors. That application is incorporated herein by reference. FIG. 2 is a process bubble diagram of operations that may be carried out by the apparatus in the exemplary distributed file system described in the above-referenced patent application.

The apparatus include a portal 230, a file server 222, and/or a combined file server and portal 250. Each of these units may be coupled with one or more networks 210 that facilitate communications among the units. One or more file system administration units 240 may be used to gather information about units added to a file system, and disseminate system control information to all of the units (e.g., supporting portal functions) of a file system. Such information gathering and dissemination may take place over the network(s) 210, or some other network.

Referring first to the file server 222, the local file operation(s) 226a represents the typical core functionality of a file system including reading and writing files, inserting and deleting directory entries, locking, etc. The local file operation(s) 226a translates given requests into input/output ("I/O") requests that are then submitted to a peripheral storage interface operation(s) 228a. The peripheral storage interface operation(s) 228a processes all the I/O requests to the local storage sub-system 229a. The storage sub-system 229a can be used to store data such as files. The peripheral storage interface operation(s) 228a may be used to provide data transfer capability, error recovery and status updates. The peripheral storage interface operation(s) 228a may involve any type of protocol for communication with the storage sub-system 229a, such as a network protocol for example. File operation requests access the local file operation(s) 226a, and responses to such requests are provided to the network(s) 210, via network interface operation(s) 224a.

Referring now to the portal 230, a client (user) can access the file system of the present invention via an access point 238a in a file system call translation operation(s). One way for this entry is through a system call, which will typically be operating system specific and file system related. The file system call translation operation(s) 232a can be used to convert a file system request to one or more atomic file operations, where an atomic file operation accesses or modifies only one file object. Such atomic file operations may be expressed as commands contained in a transaction object. If the system call includes a file identifier (e.g., an Inode number), the file system call translation operation(s) 232a may also be used to determine a physical part of a storage medium of the file system corresponding to the transaction (e.g., a segment number) from a (globally) unique file identifier (e.g., Inode number). The file system call translation operation(s) 232a may include a single stage or multiple stages. This file system call translation operation(s) may also contain local cache 233a. This local cache 233a may include a local data cache, a cache of file blocks and other information that may be frequently needed by a client, or by a program servicing a client. If a request cannot be satisfied using local cache 233a, the file system translation operation(s) 232a may forward the transaction object containing atomic file operation commands to the transaction routing operation(s) 234a.

The transaction routing operation(s) 234b uses the (globally) unique file identifier (e.g., Inode number) associated with each atomic file operation command, or the physical part of file system (e.g., the segment number) derived there from, to determine the location (e.g., the IP address) of a file server 222/250 that is in charge of the uniquely identified file. This file server can be local (i.e., a unit acting as both a portal and a file server, that received the request) or remote. If this file server is local, the transaction routing operation(s) 234b simply passes the file operation to the local file operation(s) 226b which, in turn, passes an appropriate command(s) to the peripheral storage interface operation(s) 228b for accessing the storage medium 229b. If, on the other hand, the file server is remote, the network(s) 210 is used to communicate this operation. The system is independent of any particular networking hardware, protocols or software. All networking requests are handed over to a network interface operation(s) 236b.

The network interface operation(s) 224/236 services networking requests regardless of the underlying hardware or protocol, and is used to forward the transaction towards the appropriate file server 222. The network interface operation (s) 224/236 may provide data transfer, error recovery and status updates on the network(s) 210.

Figure 3:
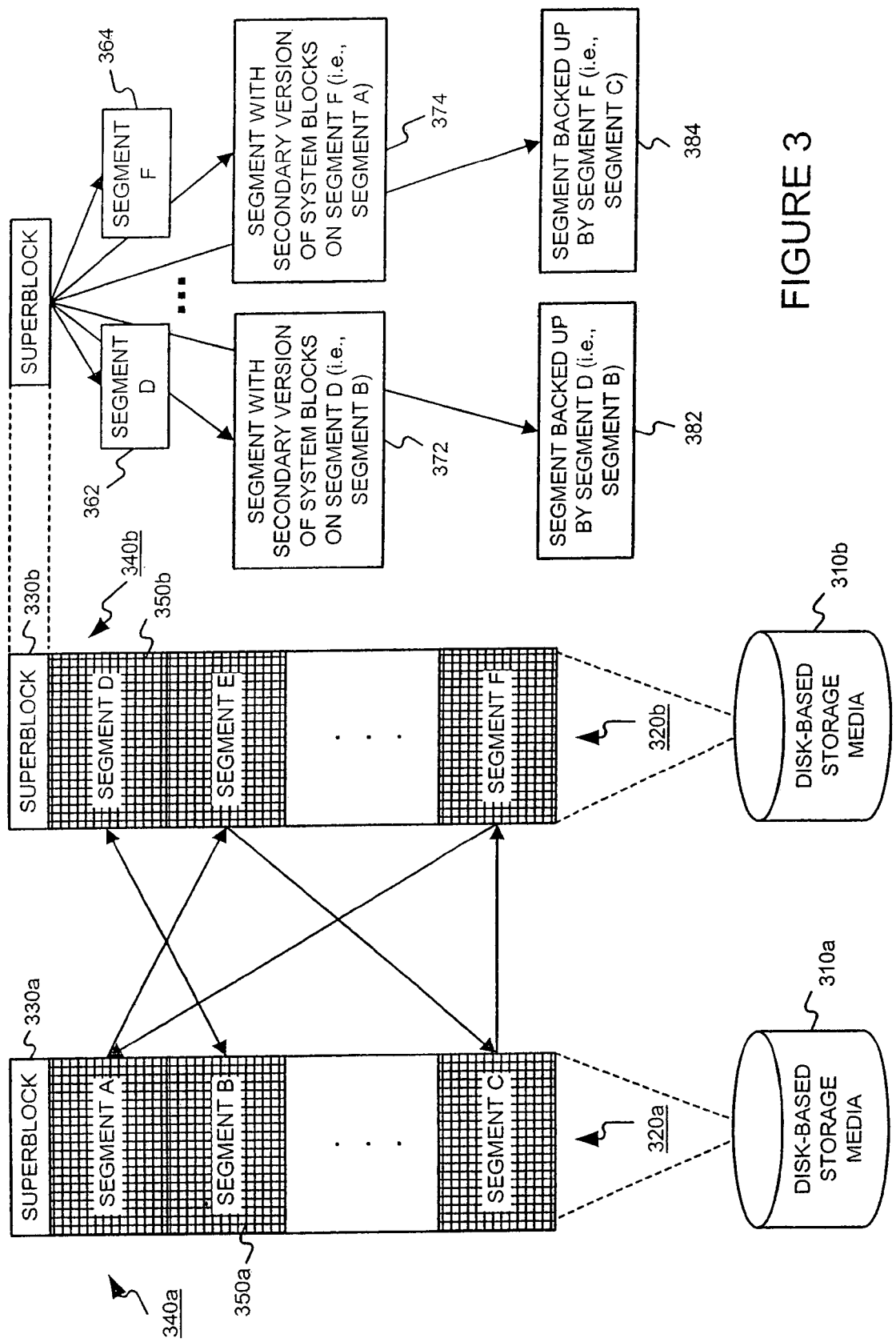
FIG. 3 is block diagram illustrating how system blocks of a segment on one storage medium are backed up on another segment on another storage medium, as well as how super-blocks (or some other partition control block) can be used to track such information.

Referring now to FIG. 3, rather than using a disk (or some other discrete storage unit or medium) 310 as a fundamental unit of a file system, the exemplary file system of the above referenced patent application employs a smaller unit, referred to as a "segment" 340. A segment 340 is a contiguous range of disk (or other storage medium) memory with a predetermined maximum size (e.g., 64 gigabytes ("GB") in one exemplary embodiment). The actual target size for a segment is configurable. In one exemplary embodiment, the target size is four (4) GB. The actual sizes of segments can vary from disk (or other storage medium) to disk (or other storage medium).

To determine what each disk (or some other storage medium) contains, a superblock (or some other partition control block) 330 is provided at a fixed address. This superblock 330 contains a map of all the segments 340 residing on this disk (or some other storage medium). Such a map may list the blocks 350 where the segments start. The superblock 330 may also associate the file system(s) with the segments that belong to the file system.

In the exemplary file system of the above identified patent application, a block stored on a disk (or some other storage media) may be addressed by (i) a segment number, and (ii) a block number within the segment. The translation of this address to a physical disk address need only occur only at (or by) the lowest level, by the peripheral storage interface operation(s) (e.g., thread) 228 of the appropriate file server 222/250. None of the basic file system functionality needs to know anything about which disk (or other storage medium) the segment resides on, or whether or not two segments are on the same physical hardware. That is, the client and file system calls from the client don't need to know anything about which disk (or other storage medium) a segment is on (or even the segment for that matter). Neither, in fact, do the local file operations 226 need to know anything about the disk (or other storage medium) that a given segment resides on.

Within a file system of the exemplary environment described in the above-referenced patent application, each (globally) unique file identifier ("FID") (e.g., an Inode number) is associated with a single controlling segment, though each segment can have more than one associated FID (e.g., Inode number). The FIDs (e.g., Inode numbers) can be associated with their segments in a simple fixed manner. For example, in an exemplary embodiment of the present invention, any segment has a fixed number of Inode numbers that it potentially can (i.e., may) store.

For example, for a maximum segment size of 64 GB, the fixed number of Inodes per segment may be 8,388,608 (this number comes from dividing the 64 GB maximum segment size by an average file size of 8 KB). In this exemplary embodiment, the segment number can be used to determine the actual ranges of Inode numbers controlled by a segment in the file system. For example, the first segment (number 0) of a file system would have Inode numbers 0 through 8,388,607. The second segment would have Inode numbers 8,388,608 through 16,777,215, and so on. The root Inode (directory) of a file system is assigned the number 1 by convention (Inode 0 is not used) and, of course, resides on the first segment. Note that the foregoing numbers represent the maximum ranges of Inodes that a given segment may control—the actual numbers of Inodes that have been allocated will generally be much smaller.

An Inode in the exemplary environment may have essentially the same properties as that of a traditional file system Inode. A number uniquely identifies the Inode, which in an exemplary embodiment is a 64-bit quantity.

This convention also makes it simple to distribute the file system over multiple servers as well—all that is needed is a map of which segments of the file system reside on which host file server. More specifically, once the segment number is derived from the Inode number, the appropriate file server can be determined by mapping, such as a routing table. In the simplest case, this map is simply a table that lists the file servers (on which the local agents execute) corresponding to particular segments. In one exemplary embodiment, the file server is identified by its IP address. More generally, file servers may be organized in groups, in a hierarchy, or in some other logical topology and the lookup may require communication over the network with a group leader or a node in a hierarchy.

Client (user) entry and access to the entire file system may thus occur through any unit that has translation and routing operations, and that has access to a segment location map. Such units may be referred to as "portals." Multiple simultaneous access points into the system are a normal configuration of the file system. Note that a portal unit will not need a file system call translator operation(s) 232, assuming that such operations are provided on the client (end user) machines. However, such a configuration will require software installation and maintenance on a potentially large number of machines.

Referring back to FIG. 3, blocks 350, especially system blocks, may be duplicated for fault-tolerance, either on the same disk (or some other storage medium) or a different one. The superblock 330a of a storage medium 310a may include information about a backup duplicate of a block, such as a system block stored on the storage medium 310a. Conversely, the superblock 330a of a storage medium 310a may include information about the original (primary copy of a) block, such as a system block, that is backed up by a backup duplicate stored on the storage medium 310a.

In one exemplary embodiment illustrated in FIG. 3, a particular segment contains blocks (e.g., system blocks) that are backup duplicates of blocks (e.g., system blocks) of an associated segment. For example, blocks in segment D of storage medium 310b may be backed up by duplicates of such blocks on segment B of storage medium 310a. (See, e.g., 362 and 372. Similarly, blocks in segment F of storage medium 310b may be backed up by duplicates of such blocks on segment A of storage medium 310a. (See, e.g., 364 and 374.) Segment D itself may have backup duplicates of blocks from segment B. (See, e.g., 362 and 382.) Similarly, Segment F itself may have backup duplicates of blocks from segment C of storage medium 310a. (See, e.g., 364 and 384.)

By aggregating the backup of blocks based on the segment in which they reside, this exemplary embodiment simplifies the backup process by abstracting blocks to segments. Such abstraction is not required however. For example, a first block residing on segment A could be backed up by a duplicate thereof residing on segment D, while a second block residing on segment A could be backed up by a duplicate thereof residing on segment G of some other storage medium (not shown).

§ 4.2 FUNCTIONS THAT MAY BE PERFORMED BY THE PRESENT INVENTION

The present invention may function to provide consistency of a file system, particularly for blocks of storage containing critical or important system information (e.g., Metadata). Such blocks may be referred to as "system blocks", which are an example of Metadata. System blocks may include super blocks (or some other partition control block), Inode blocks (or some other file control block), directory blocks, blocks referring to file block locations, and other blocks carrying information important or critical to a file system. The present invention may provide consistency of the file system by protecting such system blocks. Such system blocks (or any block) may be protected by (i) duplicating and verifying the system blocks, (ii) writing system blocks as a sequence of atomic commands so that at any given time, there is a valid system block on a physical data storage device, and/or (iii) performing updates to the file directory data structure (e.g., a rooted tree) atomically. As will become apparent, various aspects of the present invention perform one or more of the following basic functions: (1) proactive measures which account for potential problems; (2) detecting the occurrence of a problem; and (3) reacting to a detected problem to correct the problem, or at least to minimize its impact.

Having introduced functions that may be performed by the present invention, exemplary operations, data structures, methods and apparatus for effecting these functions are described in § 4.3 below.

§ 4.3 EXEMPLARY OPERATIONS, DATA STRUCTURES, METHODS AND APPARATUS FOR EFFECTING FUNCTIONS THAT MAY BE PERFORMED BY THE PRESENT INVENTION

In the following, exemplary operations that may be performed by the present invention, and exemplary data structures that may be used by the present invention, are introduced in § 4.3.1 with reference to FIGS. 3, 4 and 5. Then, exemplary methods for effecting such operations are described in § 4.3.2 with reference to FIGS. 6-14. Finally, exemplary apparatus that may be used to effect the exemplary processes and store the exemplary data structures are described in § 4.3.3 with reference to FIG. 15.

§ 4.3.1 Exemplary Operations and Data Structures

Referring back to FIG. 3, recall from § 4.1 above that a block (e.g., a system block) on one storage medium can be backed up by a duplicate thereof on another storage medium. Recall further that a superblock 330 can be used to store information about (i) system blocks residing on the storage medium, (ii) backup duplicates residing on the storage medium of system blocks residing on another storage medium, and (iii) backup duplicates of the blocks residing on the storage medium.

Figure 4:
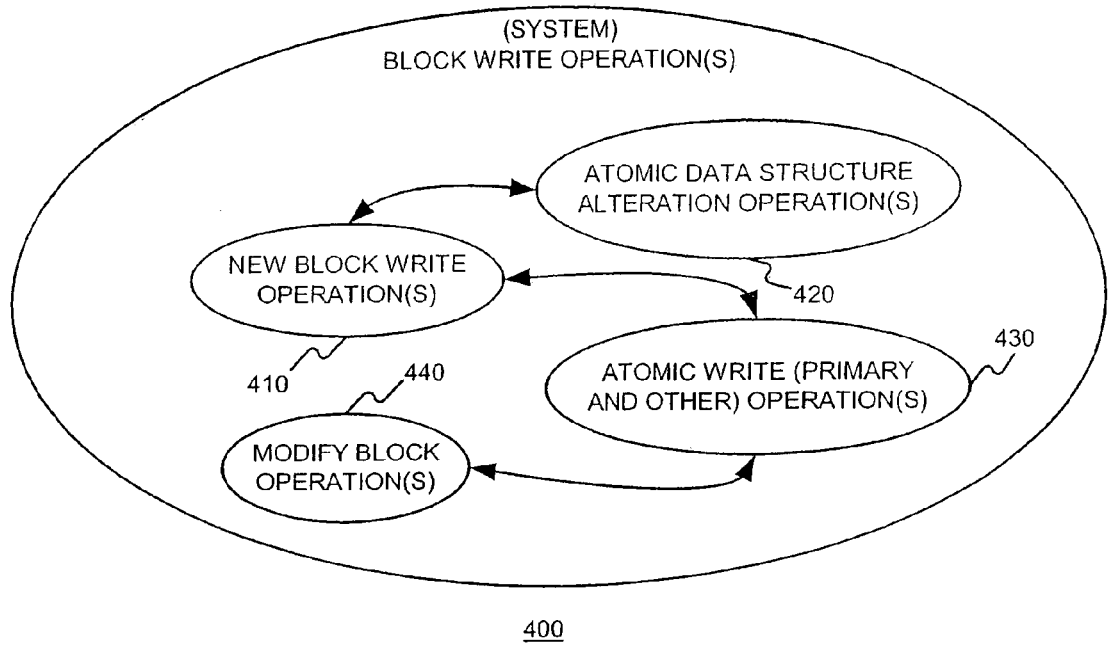
FIG. 4 is a process bubble diagram of block write operations that may be used in the present invention.

FIG. 4 is a process bubble diagram of block write operations 400 that may be used in the present invention. As is known, blocks may be transferred from a main memory (e.g., RAM) to a secondary storage (e.g., a disk). Such operations 400 may include an operation(s) 410 to write new blocks, an operation(s) 440 to modify existing blocks, an operation(s) 420 to alter data structures used to organize system blocks, and a basic write operation(s) 430. The basic write operation(s) 430 may be used both by the new block write operation(s) 410, and the modify block operation(s) 440. Exemplary methods that may be used to effect such operations are described in § 4.3.2 below.

Figure 5:
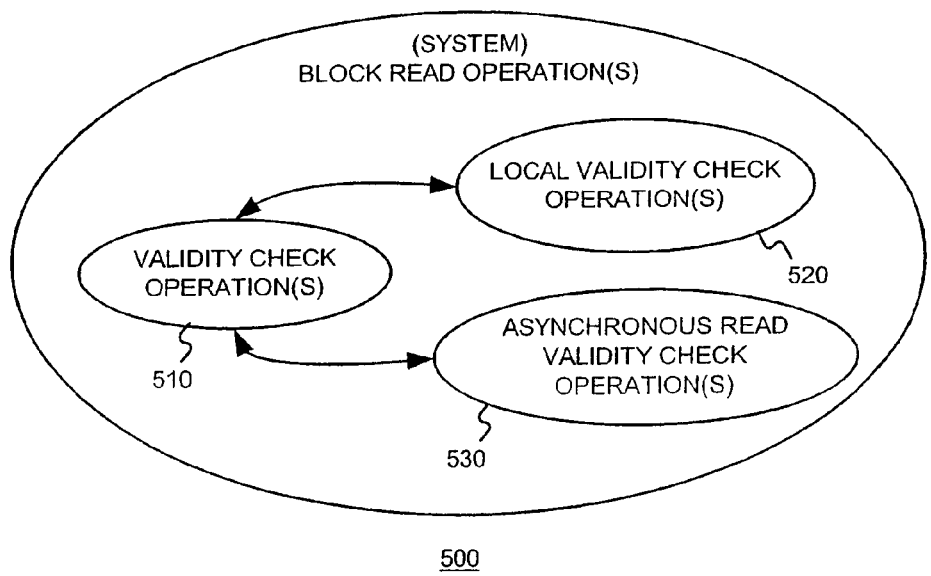
FIG. 5 is a process bubble diagram of block read operations that may be used in the present invention.

FIG. 5 is a process bubble diagram of block read operations 500 that may be used in the present invention. As is known, blocks may be transferred from secondary storage (e.g., a disk) to a main memory (e.g., RAM). Such operations 500 may include a validity check operation(s) 510 which may use a local validity check operation(s) 520 and a asynchronous (or lazy) read validity check operations(s) 530. Exemplary methods that may be used to effect such operations are described in § 4.3.2 below.

§ 4.3.2 Exemplary Methods

Exemplary methods that may be used to effect some of the operations introduced in § 4.3.1 above, are now described.

Figure 6:
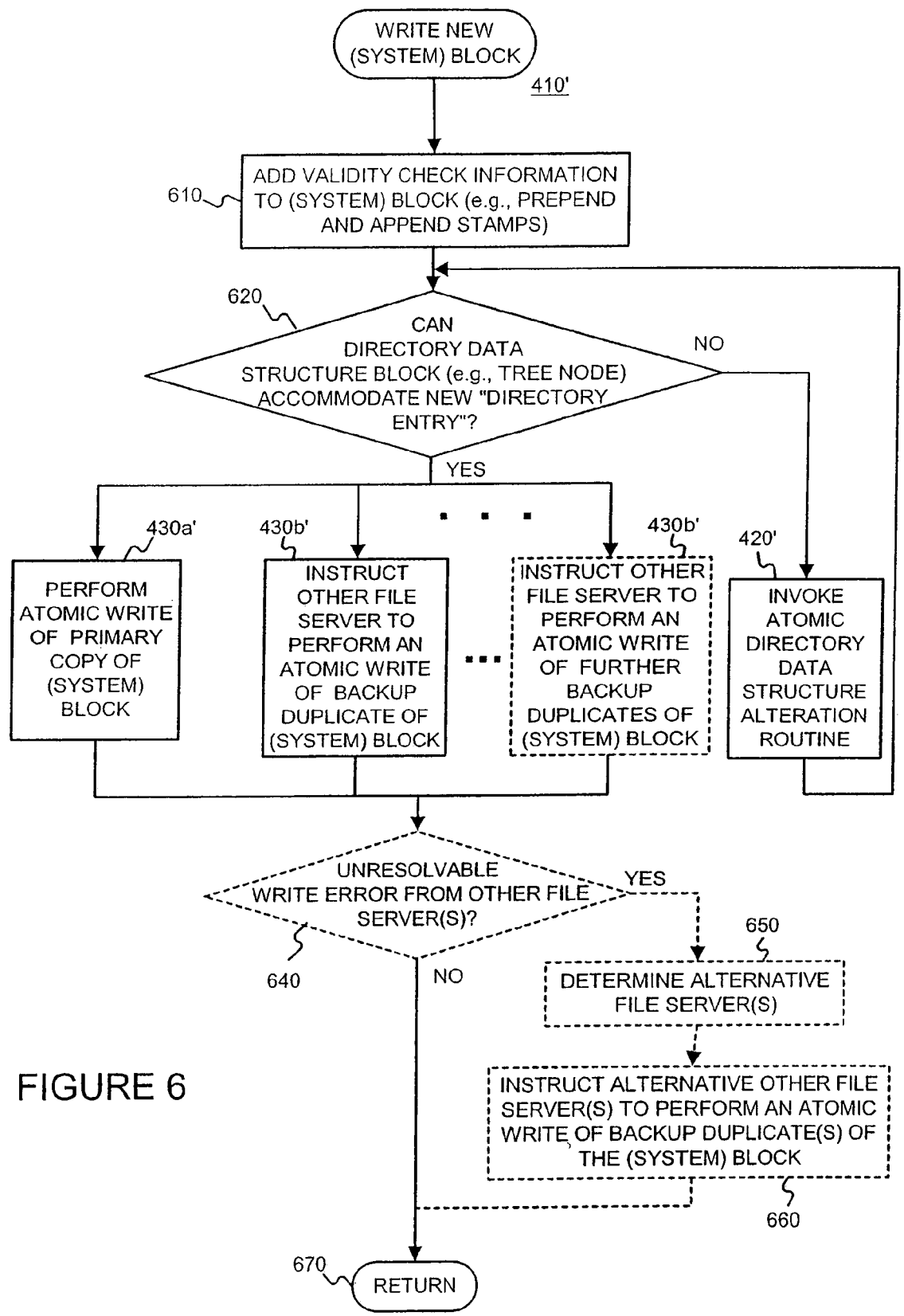
FIG. 6 is a flow diagram of an exemplary method that may be used to write a new (system) block.

FIG. 6 is a flow diagram of an exemplary method 410 that may be used to effect a write new (system) block operation(s) 410. As indicated by act 610, validity check information may be added to a system block. For example, every (system) block may include a checksum. Further, or alternatively, every type of (system) block may provide space at the beginning and end of the block for stamps. In one exemplary embodiment, the values of the stamps at the beginning and end of a (system) block must be identical for the block to be considered valid, the values of the stamps must be unique with respect to any given (system) block update, and the stamp of all versions of the (system) block must be identical. The stamps may be 64-bit numbers reflecting the value of a counter at the time of the disk write. This counter is unique to each (system) block. The counter starts as zero when the (system) block is created and is incremented each time it is updated. Such a stamp would satisfy all of the requirements of the exemplary embodiment described above. Other techniques are possible. In fact, random numbers can be used to specify the stamp, as long as the random number is different from the previous stamp and both stamps have the same number. Further, stamps needn't be identical, so long as they can be compared for purposes of validity. For example, one stamp could be a predetermined function of (e.g., a fixed offset from) its companion stamp.

Referring back to FIG. 6, at conditional branch point 620, it is determined whether or not a data structure for organizing (system) blocks (e.g., into a file system directory) can accommodate a new directory entry associated with (and a pointer to) the new (system) block. For example, hierarchical data structures, such as trees, are often used to organize system blocks used for organizing the file system (referred to as "'directory' system blocks" in the specification below without loss of generality). For example, balanced M-ary trees (e.g., M=64) have been used to organize system blocks of file systems. Balanced trees are described in the text R. Sedgewick, *Algorithms in C, Parts* 1-4: *Fundamentals, Data Structures, Sorting, Searching,* 3d Ed., pp. 529-572 (Addison-Wesley, 1998), incorporated herein by reference. Basically, when a node of the M-ary tree has more than M children, the tree must be reconfigured. In one embodiment of the present invention, "directory blocks" correspond to nodes of a tree data structure. An exemplary "directory block" is an 8K block of space. Each of the directory blocks includes up to a predetermined number of (e.g., 128) directory entries and up to another predetermined number of (e.g., 129) pointers. (The extra pointer may be used to point to a parent directory block.) An exemplary directory entry includes a 64-bit Inode number, an Inode version, an Inode type, flags, a length of the directory name, and a directory name. Each of the pointers can be associated with a directory entry and can point to another directory block, or to some other data structure.

If a write requires a new directory entry, and that directory entry cannot be accommodated within the appropriate directory block, an atomic data structure alteration routine, described later, is invoked as indicated by act 420'.

Referring back to conditional branch point 620, if the appropriate directory block can accommodate the new directory entry, then the original (a primary copy of the) directory entry is written, as indicated by act 430a', and another file server(s) is instructed to write one or more backup duplicates of the directory entry, as indicated by acts 430b'. The method 410' may then be left via RETURN node 670. Alternatively, the method 410' may ensure that the other file server(s) was or were able to write the backup duplicate(s) of the (system) block. More specifically, conditional branch point 640 can determine whether or not any unresolvable write error(s) was or were received from the other server(s). If not, the method 410' is simply left via RETURN node 670. If, on the other hand, an unresolvable write error was received from another server, an alternative file server for storing the backup duplicate of the (system) block may be determined as indicated by act 650, and such a determined alternative file server(s) may be instructed to write a backup duplicate of the (system) block as indicated by act 660, before the method 410' is left via RETURN node 670. Note that the method 410' may not be left via RETURN node until both atomic write of the primary copy of the directory entry, as well as that of the duplicates of such a directory entry, have been performed.

Figure 7:
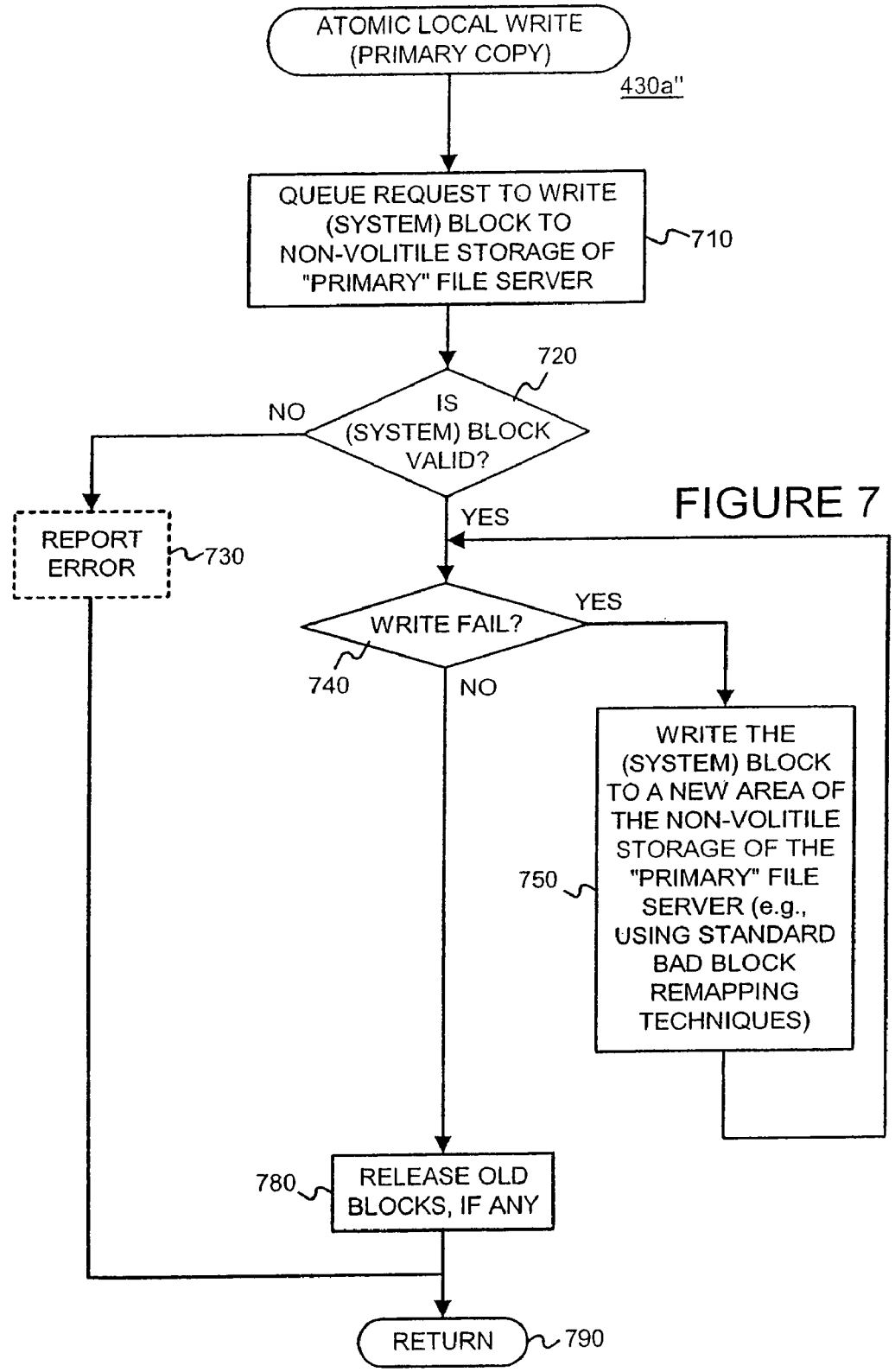
FIG. 7 is a flow diagram of an exemplary method that may be used to write an original (e.g., a primary copy of a) (system) block.

Recall from block 430a' of FIG. 6 that the primary copy of the (system) block may be written. FIG. 7 is a flow diagram of an exemplary method 430a" that may be used to write a primary copy of a (system) block. As indicated by act 710, a request to write the (system) block to non-volatile storage is queued. At conditional branch point 720, it is determined whether or not the queued (system) block is valid. For example, the (system) block may include a check sum value which can be checked. Also, for example, as discussed with reference to FIG. 6 above, the (system) block may include stamps which must match to be valid. If the (system) block is not valid, an error may be reported as indicated by act 730 before the method 430a" is left via RETURN node 790. If, on the other hand, the queued (system) block is valid, it is attempted to write the queued (system) block to the non-volatile storage medium. Referring to conditional branch point 740, if the write fails (e.g., due to a physical problem with the storage medium), the (system) block can be written to a new area of the storage medium as indicated by 750. For example, conventional bad block re-mapping techniques can be used. Although not shown, if the write(s) to the new area of the storage medium continues to fail, then (an error may be reported and) the method 430a" may be left.

Referring back to conditional branch point 740, if the write succeeded, old blocks, if any, may be released (e.g., free block counts and pointers may be updated) as indicated by act 780. The method 430a" may then be left via RETURN node 790. As can be appreciated, since the file system writes any updated file content information to a new location on the physical storage device, the old information co-exists with the new one for some period of time. For example, in one exemplary embodiment, the blocks with old information are not deleted, but are put on a queue for release. When the new information is successfully written to the disk, the blocks are put on a free queue for re-use and can be overwritten. Until then, the file system can be recovered by taking the old information blocks back from release queue. This guarantees the file system consistency and minimizes the impact of severe errors. Only the latest transaction is affected and can be lost, but the file system itself is never left in an inconsistent state.

Figure 8:
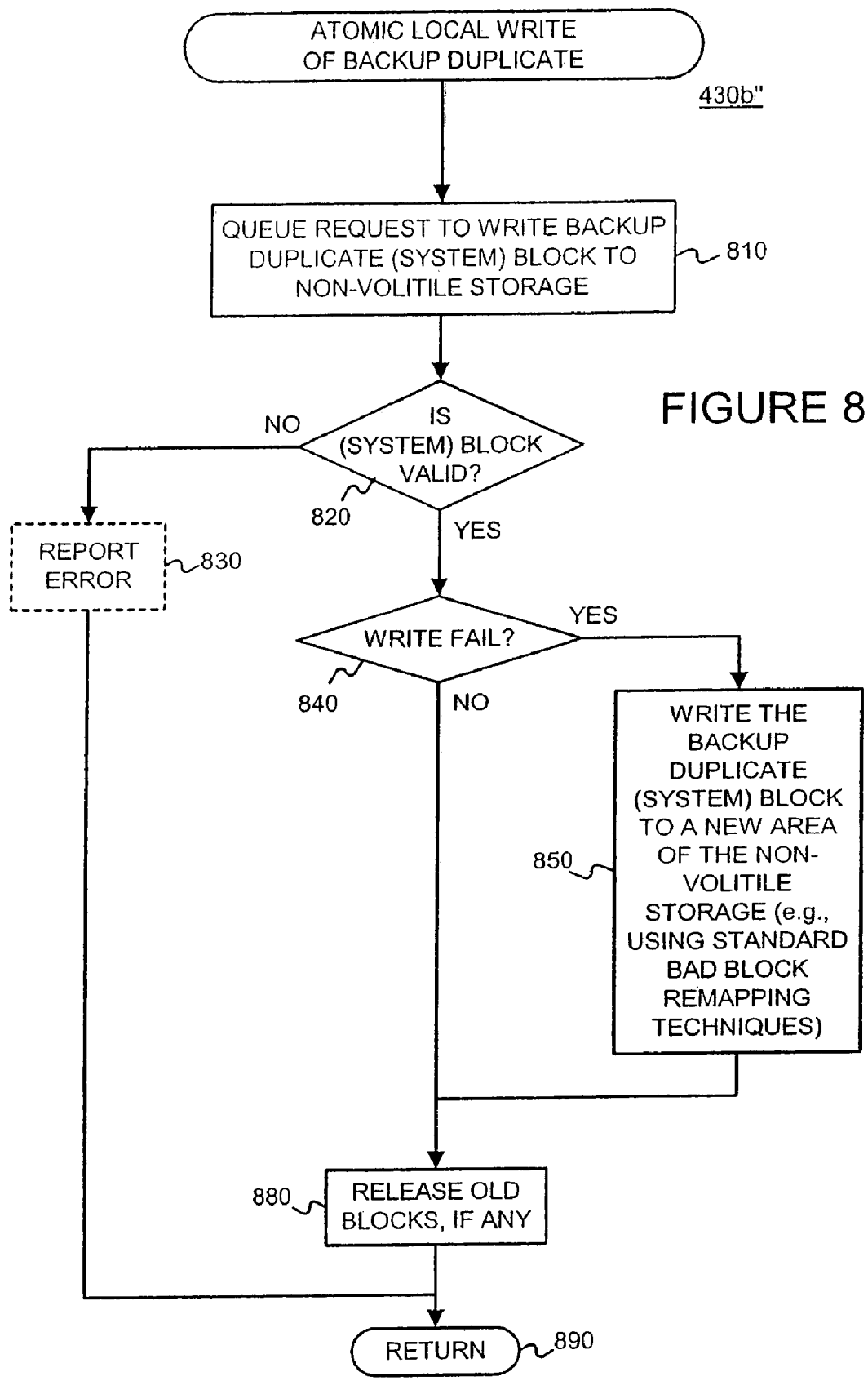
FIG. 8 is a flow diagram of an exemplary method that may be used to write a first (or other) backup duplicate of a (system) block.

Recall from block 430b' of FIG. 6 that other file server(s) may be instructed to write the backup duplicate(s) of the (system) block. FIG. 8 is a flow diagram of an exemplary method 430b' that may be used to write a backup duplicate of a (system) block. As indicated by act 810, a request to write the (system) block to non-volatile storage is queued. At conditional branch point 820, it is determined whether or not the queued (system) block is valid. If the (system) block is not valid, an error may be reported as indicated by act 830 before the method 430b" is left via RETURN node 890. If, on the other hand, the queued (system) block is valid, it is attempted to write the queued (system) block to the non-volatile storage medium of the other file server. Referring to conditional branch point 840, if the write fails (e.g., due to a physical problem with the storage medium), the (system) block can be written to a new area of the storage medium of the other file server as indicated by act 850. For example, conventional bad block re-mapping techniques can be used. Although not shown, if the write(s) to the new area of the storage medium continues to fail, then (an error may be reported and) the method 430b" may be left.

Referring back to conditional branch point 860, if the write succeeded, old blocks, if any, may be released as indicated by act 880. The method 430b" may then be left via RETURN node 890.

Figure 9:
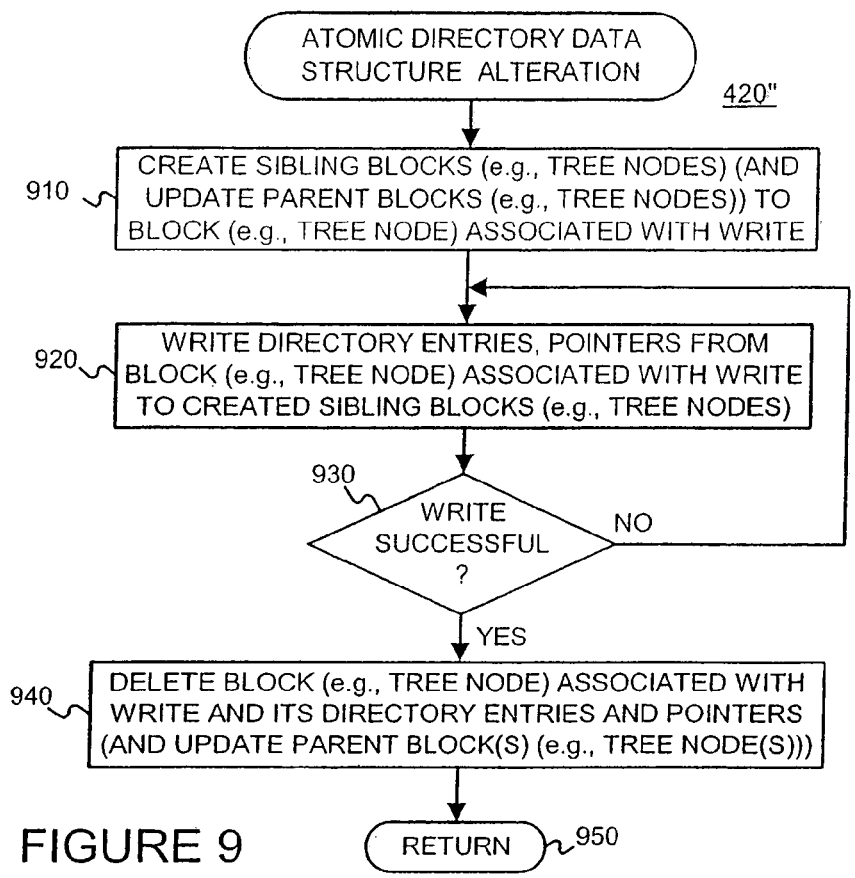
FIG. 9 is a flow diagram of an exemplary method that may be used to alter a data structure, such as a balanced tree for example, used to arrange system blocks.

Recall from block 420' of FIG. 6 that if a directory block cannot accommodate the new directory entry, an atomic data structure alteration routine may be invoked. FIG. 9 is a flow diagram of an exemplary method 420" that may be used to alter a directory data structure, such as a tree for example, in which uses "directory" blocks correspond to nodes. If the data structure is a tree, such as a 64-ary balanced tree for example, the directory entry is to be written to a directory block (associated with a node) that cannot accommodate the new directory entry. For example, if a directory block (node) can handle 128 directory entries, but already has 128 directory entries, a new directory block (node) is called for. As indicated by act 910, sibling blocks, to the block associated with the write, are created and the parent block(s) is appropriately updated. Then, as indicated by act 920, directory entries and pointers from (also referred to as "contents of") the directory block (node(s)) associated with the write are written to the created sibling directory blocks (nodes). Assuming the contents are successfully rewritten into the created sibling directory blocks, the directory block (node) originally associated with the write, as well as its contents, are deleted and the contents of the parent directory block are appropriately updated, as indicated by conditional branch point 930 and act 940. That is, if a parent directory block has a directory entry and a pointer pointing to the deleted directory block, the parent directory block is updated to include a directory entry and a pointer to each of the newly created sibling directory blocks. The method may then be left via RETURN node 950.

As can be appreciated, this exemplary method 420" can employ a standard balanced-tree algorithm, implemented in a way that ensures that no update to the directory data structure can cause an inconsistency in the event of a severe failure. From the standpoint of directory consistency, a critical point in a directory update occurs when the topology of the tree changes, i.e., directory blocks (nodes) are split or merged, or levels are added or subtracted. To ensure consistency, the disk (or some other secondary storage) image of the directory must be consistent after every disk write. The method 420" achieves this.

The writes indicated by act 920 can use the techniques illustrated in FIGS. 7 and 8 for every directory block and for every directory entry and pointer involved in the directory structure. This ensures that system failure during an atomic update of any directory block (node) of the tree has no effect on tree integrity.

Notice that when a directory block (node) of the tree is to be split, two new sibling directory blocks (nodes) are allocated and the contents of the original directory block (node) copied into them. This approach is better than allocating one new directory block (node) and copying half the contents of the original directory block (node) into it. In the latter case, if the split directory blocks (nodes) have been written at the time of severe failure, but the parent directory block (node) has not yet been updated, half the contents (e.g., directory entries and pointers) of the directory block (node) would be lost. However, the technique described above with reference to FIG. 9, the contents of the original directory block (node) remain valid and the severe failure only causes the loss of the single directory entry and/or pointer being added. The parent (referring) directory block (node) is only written after the contents and their backups are verified as having been written to newly created sibling directory blocks the secondary storage (e.g., disk). As a result, the original tree continues to be represented on the secondary storage until the final update of the referring directory block (node) occurs. The original directory block (node) is then freed after completion of the updates.

The method 420" can be applied at every level of the (e.g., M-ary) tree so that even when splits propagate more than one level, the entire tree remains consistent. The original tree image remains intact on disk until an upper-level directory block (node) is modified without the need to split. At that point all of the changes made below become reflected in the disk (or some other secondary storage) image of the directory.

A split of the top-level directory block (node) is a special case, since it is the root directory block (node) and there is no existing parent directory block (node) on disk. In addition, a file control block (e.g., Inode) itself refers to this root to refer to the entire tree structure. To resolve this case, the described technique may be further modified to specify that the root directory block (node) cannot change. Just as described and shown above, two new directory block (nodes) are allocated and the root directory block (node) entries are copied into them. However, instead of putting the root directory block (node) on a list of blocks to be freed, the root directory block (node) is re-used as the new root directory block (node) (again, the final operation waits until all directory blocks (nodes) below are verified to be on disk before modifying the root directory block (node)). As described and shown above, this method guarantees that the entire previous version of the tree remains on disk until the final update.

Deletion of an directory entry may lead to merging of the contents of two directory blocks (nodes). Once again, in such a case, both the directory blocks (nodes) to be merged and the referring directory block (node) above them are changed. Therefore, instead of merging the contents of the two directory blocks (nodes) into one of them, a new directory block (node) is allocated, the contents of the two directory blocks (nodes) are merged into it, and the old directory blocks (nodes) are placed on a list to be freed after the update is complete. As above, the writes of the contents into the new directory block (node) are verified before the referring directory blocks (nodes) can be updated. Such a merging technique could be invoked when a block is freed (and its directory entry and/or pointer isn't needed) and the directory block to which the directory entry and/or pointer becomes empty, which may occur at act 780 of FIG. 7 or act 880 of FIG. 8.

Any other hierarchical file system structures can be treated in similar manner.

Figure 10:
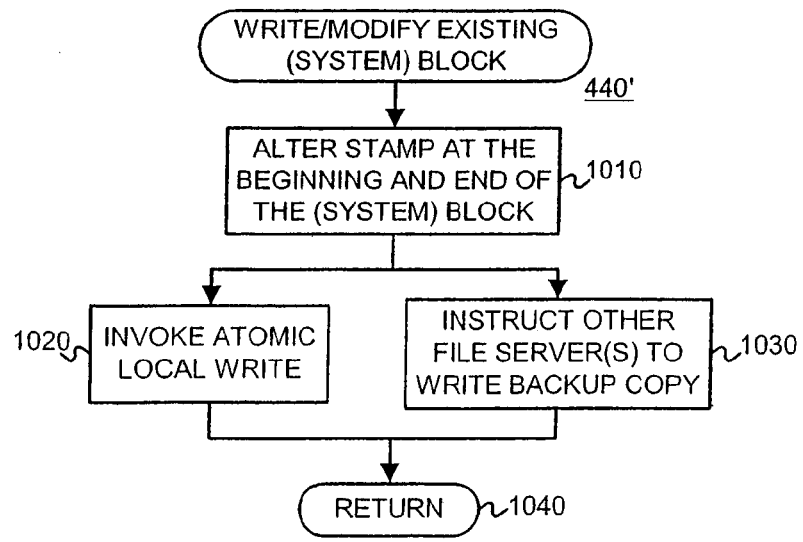
FIG. 10 is a flow diagram of an exemplary method that may be used to modify an existing (system) block.

FIG. 10 is a flow diagram of an exemplary method 440' that may be used to modify an existing (system) block. First, as shown by act 1010, the validity check information (e.g., the stamp at the front and back of the (system) block may be altered. If the stamps reflect the value of a counter, the counter may start at zero when the (system) block is created and may be incremented each time it is updated. Other techniques are possible. In fact, random numbers can be used to specify the stamp, as long as the random number is different from the previous stamp and both stamps have the same number, or can be checked for consistency with one another. Then, as indicated by act 1020 a local atomic write (of the primary copy of the (system) block) can be invoked (Recall, e.g., FIG. 7.). Further, as indicated by block 1030, another file server(s) can be instructed to write a backup duplicate(s) of the (system) block (Recall, e.g., FIG. 8.). The method 440' may then be left via RETURN node 1040.

Figure 12:
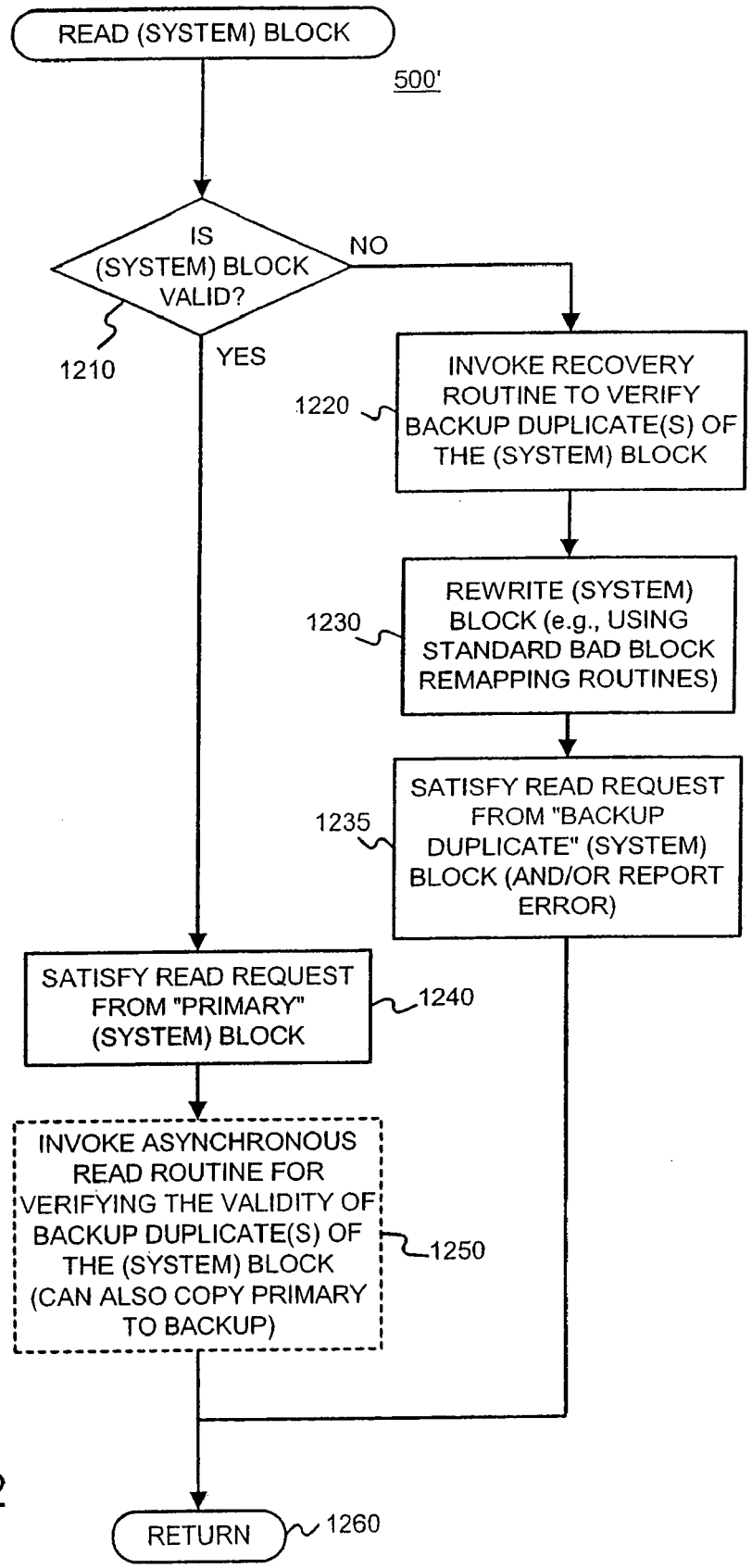
FIG. 12 is a flow diagram of an exemplary method that may be used to read a (system) block.

FIG. 12 is a flow diagram of an exemplary method 500' that may be used to read a (system) block. At conditional branch point 1210, it is determined whether or not the (system) block being read is valid. This can be done based on the checksum and/or by comparing the stamps at the front and back of the (system) block. If the (system) block is determined to be valid, the read request is satisfied (from the primary copy of the system block), as indicated by block 1240. Then, as indicated by block 1250, asynchronous (or "lazy") reads can be used to verify the validity of the backup duplicates of the (system) block on other file server(s). An example of such an asynchronous or lazy read is described below with reference to FIGS. 13 and 14. Finally, the method 500' may then be left via RETURN node 1260.

Referring back to conditional branch point 1210, if it is determined that the (system) block is not valid, a recovery routine to verify a backup duplicate of the (system) block may be invoked, as indicated by act 1220. If a backup duplicate of the (system) block is valid, then it can be used to rewrite the original (system) block as indicated by block 1230. Further, as indicated by block 1235, the read request may be satisfied from the backup duplicate(s) of the (system) block. An error may also be reported.

Figure 13:
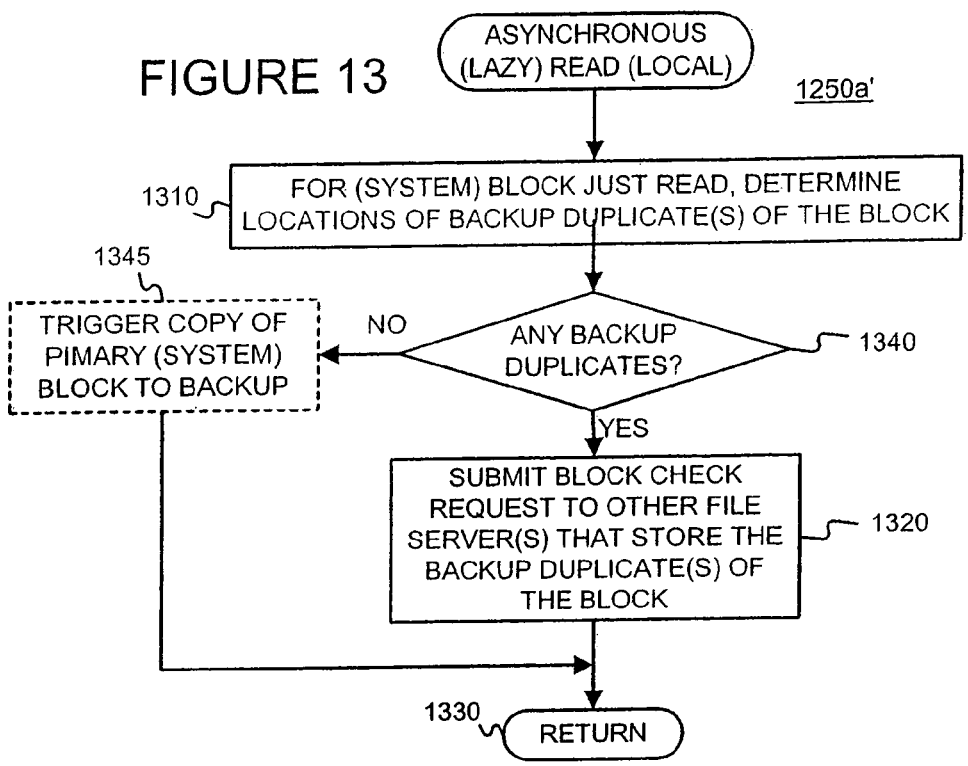
FIGS. 13 and 14 are a flow diagrams of exemplary methods that may be used to perform a validity check on first (or other) duplicate copies of an original (system) block just read.
Figure 14:
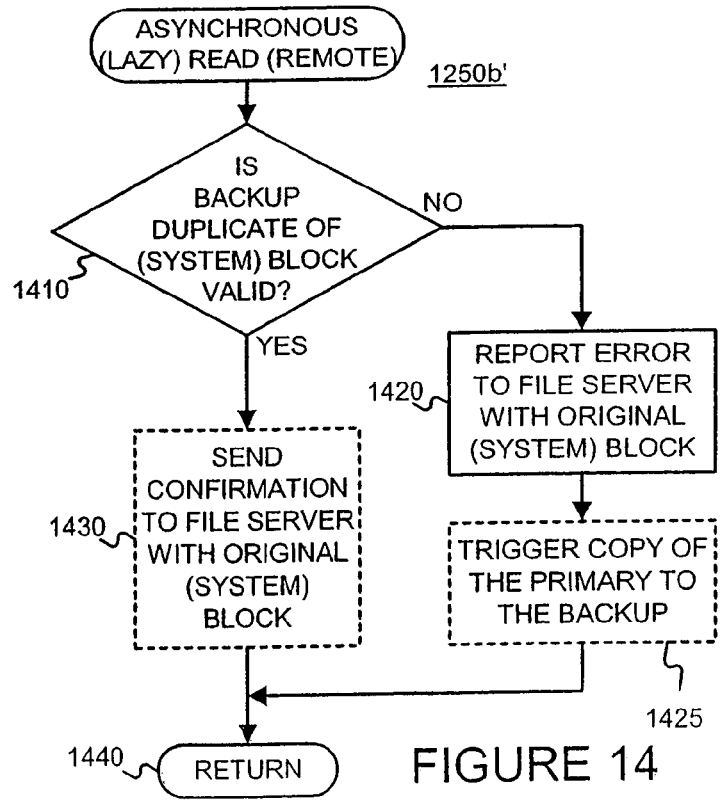

Recall from act 1250 of FIG. 12 that an asynchronous or lazy read can be invoked to check the validity of a backup duplicate(s) of a (system) block. FIGS. 13 and 14 are a flow diagrams of exemplary methods that may be used to perform a validity check on a backup duplicate(s) of a (system) block just read. The method of FIG. 13 exemplifies what can occur locally, at the file server storing the original (primary version of the) (system) block, while the method of FIG. 14 exemplifies what can occur remotely, at the file server(s) storing a backup duplicate(s) of the (system) block.

As shown in the method 1250a' of FIG. 13, for a (system) block just read, the location(s) of a backup duplicate(s) of the (system) block are determined as indicated by block 1310. The location(s) is considered the file server(s) storing a backup duplicate(s), and any other information which can be used to uniquely identify the backup duplicate(s) of the (system) block. In one embodiment, the superblock of the storage medium storing the original (primary copy of the) (system) block indicates the segment on which the backup duplicate(s) is stored. A unique file identifier (e.g., an Inode number) of the backup duplicate(s) of the (system) block may also, or alternatively, be provided in the superblock. However, if the invention is used in the exemplary embodiment described in § 4.1 above, then the segment can be derived from the unique file identifier (e.g., the Inode number). Still referring to FIG. 13, a block check request can then be submitted to the other file server(s) that stores the backup duplicate(s) of the (system) block, as indicated by block 1320, before the method 1250' is left via RETURN node 1330. Referring to optional conditional branch point 1340 and block 1345, it there is no backup duplicate(s) of the primary (system) block (e.g., if the system was configured so that blocks 4306' of FIG. 6 were not performed), the "primary" system block may be backed up by a new backup duplicate(s). Recall from blocks 4306' of FIG. 6 that this may be initiated by instructing another file server to perform an atomic write of a backup duplicate of the (system) block.

The method 1250b' of FIG. 14 may be invoked upon the receipt of a block check request. As indicated by conditional branch point 1410, it is determined whether or not the backup duplicate of the (system) block is valid. If not, the error may be reported to the file server with the original (primary version of the) (system) block, as indicated by block 1420, before the method 1250b' is left via RETURN node 1440. In this way, the file server with the original (primary version of the) (system) block can take appropriate actions to backup the (system) block. For example, as indicated by block 1425, the "primary" system block may be backed up by new backup duplicate(s). Recall from blocks 430b' of FIG. 6 that this may be initiated by instructing another file server to perform an atomic write of a backup duplicate of the (system) block. If, on the other hand, the backup duplicate of the original (system) block is valid, then, as shown in act 1430, a validity confirmation may be returned to the file server that submitted the block check request. Alternatively, if no validity confirmation is sent, the file server storing the original (system) block may assume that the backup duplicate is valid unless informed otherwise. The method 1250b' may then be left via RETURN node 1440.

§ 4.3.3 Exemplary Apparatus

Figure 15:
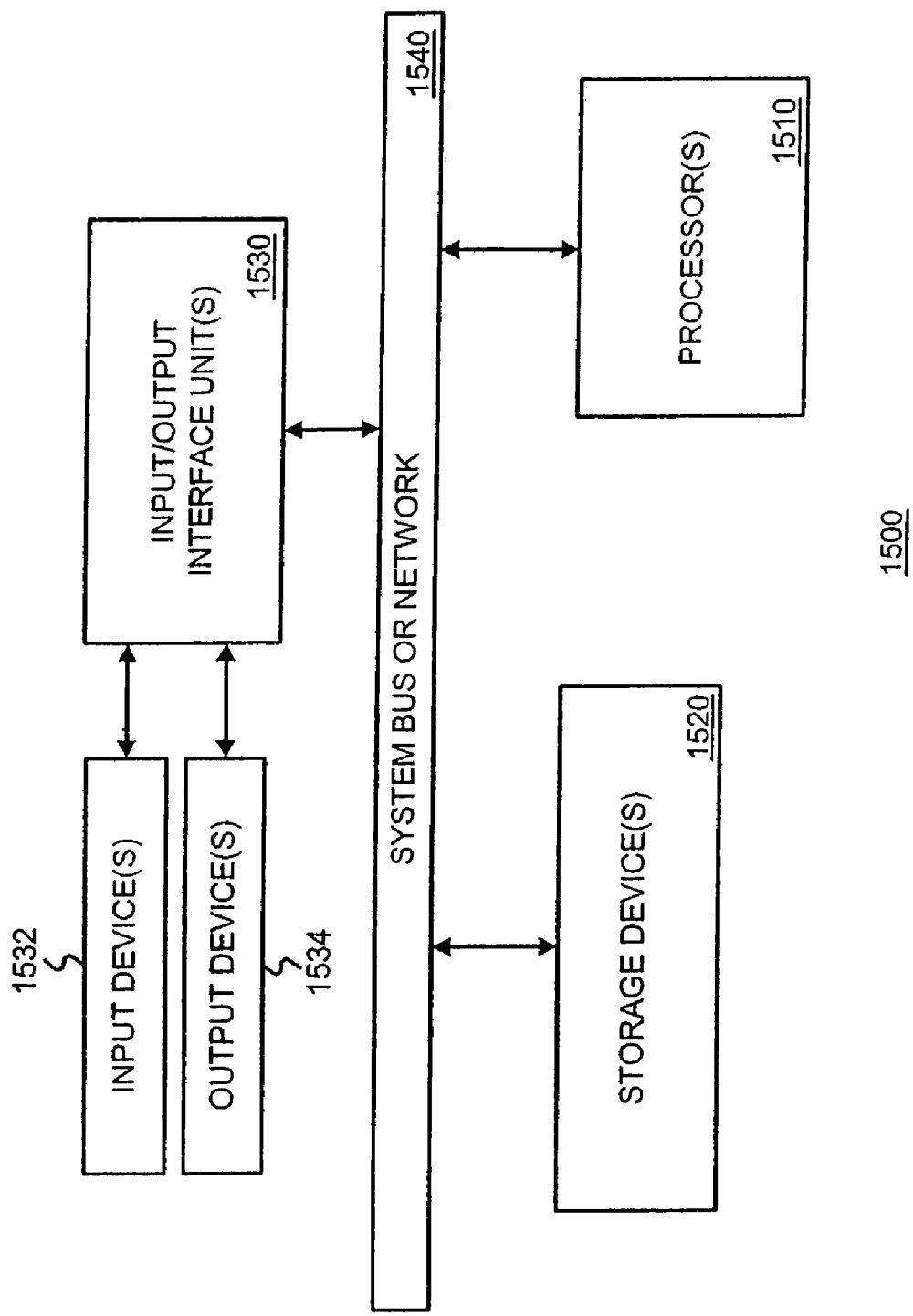
FIG. 15 is a block diagram of an exemplary apparatus that may be used to effect various aspects of the present invention.

FIG. 15 is high-level block diagram of a machine (e.g., a computer, a personal computer, a hand-held computer, a network server, etc.) 1500 that may effect one or more of the operations discussed above. The machine 1500 basically includes a processor(s) (e.g., microprocessors, ASICs, etc.) 1510, an input/output interface unit(s) 1530, a storage device (s) (e.g., RAM, ROM, disk-based storage, etc.) 1520, and a system bus or network 1540 for facilitating the communication of information among the coupled elements. An input device(s) 1532 and an output device(s) 1534 may be coupled with the input/output interface(s) 1530.

The processor(s) 1510 may execute machine-executable instructions to effect one or more aspects of the present invention. At least a portion of the machine executable instructions may be stored (temporarily or more permanently) on the storage device(s) 1520 and/or may be received from an external source via an input interface unit 1530. The storage device (s) 1520 may include a main memory (e.g., PAM) and secondary storage (e.g., larger, non-volatile storage such as disk-based storage). The file system may be maintained on the secondary storage. If the invention is to be used in the environment of FIGS. 1 and 2, more than one machine 1500 may be provided and may communicate with one another via a network(s).

§ 4.4 EXAMPLES OF OPERATIONS OF EXEMPLARY EMBODIMENT

Figure 16:
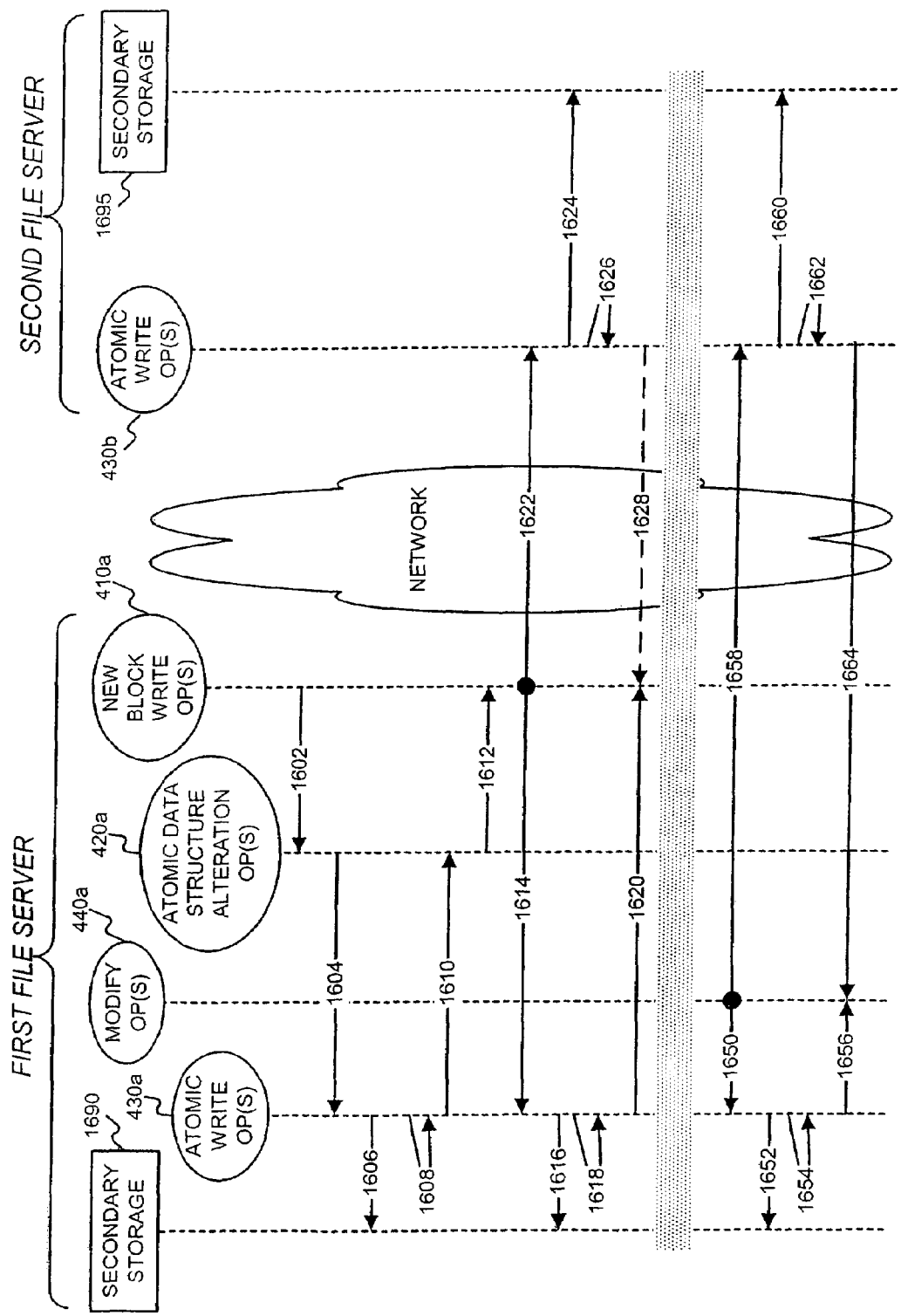
FIG. 16 is a messaging diagram that illustrates examples of writing a new system block and modifying a system block.

FIG. 16 is a messaging diagram that illustrates examples of writing a new system block and modifying a system block. A new system block is to be written and the new block write operation(s) 410a adds validity check information (e.g., stamps.) and checks to determine whether the directory data structure can accommodate a new directory entry corresponding to the new (system) block. Assuming that it cannot, the atomic data structure alteration operation(s) 420a is invoked as indicated by communication 1602. (Recall, e.g., 630 and 420' of FIG. 6.) The atomic data structure alteration operation(s) 420a then generates a new data structure (e.g., add sibling directory blocks (nodes) and update parent directory blocks (node(s))) (Recall, e.g., 910 of FIG. 9.) FIGS. 11A through 11D illustrate an example of how the present invention may be used to alter a tree data structure defined by directory blocks.

Figure 11A:
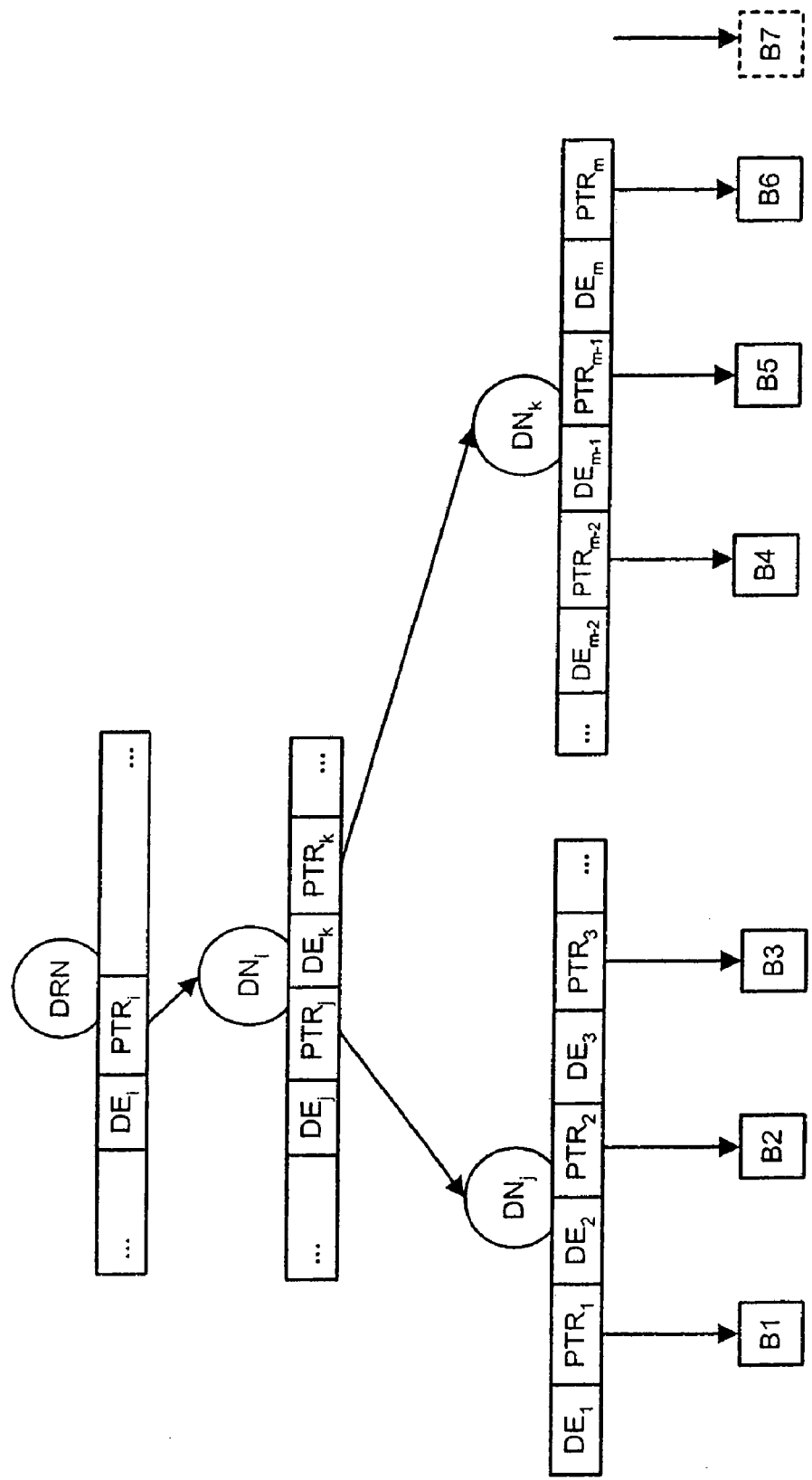
FIGS. 11A through 11D illustrate an example of how the present invention may be used to alter a tree directory structure used to arrange system blocks.
Figure 11B:
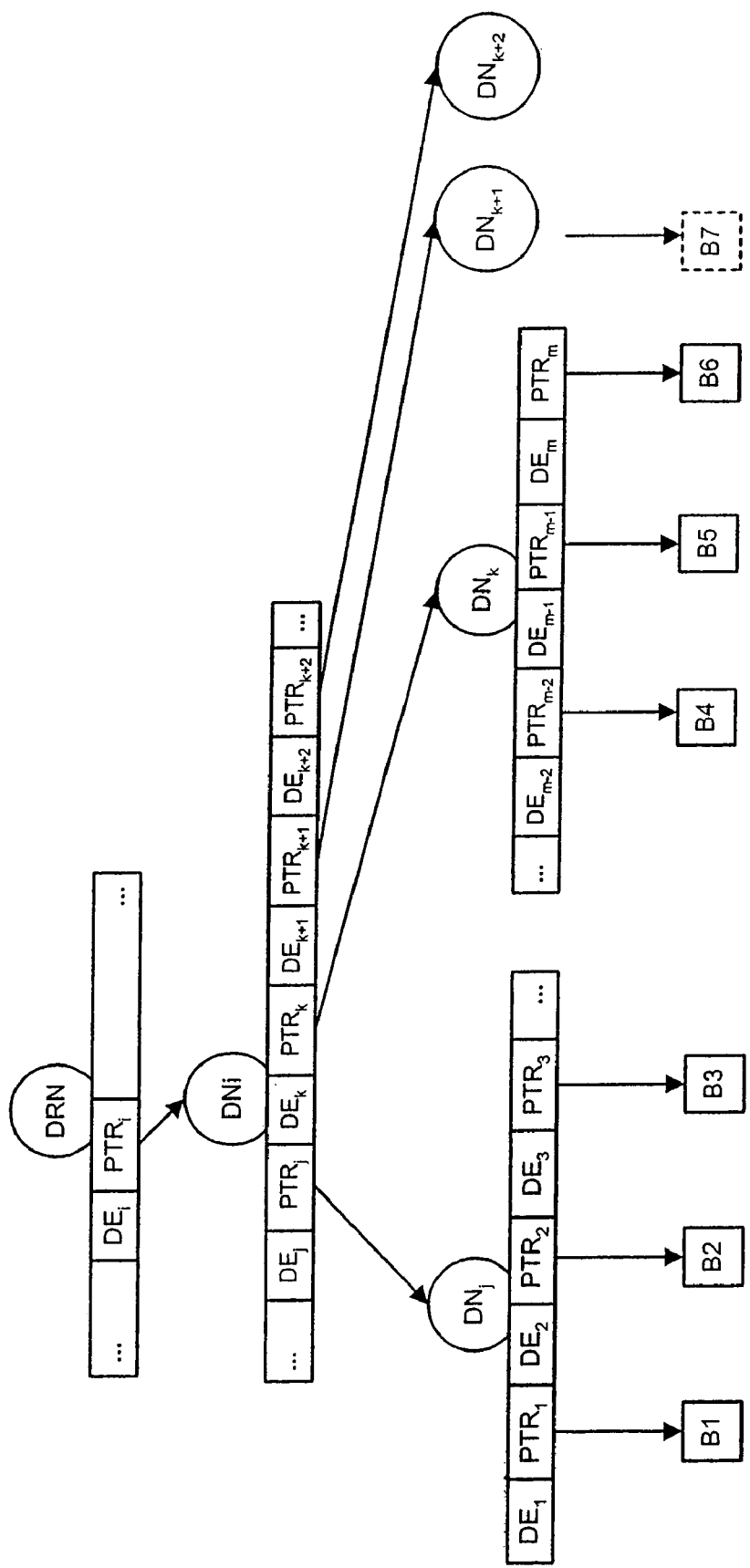
Figure 11C:
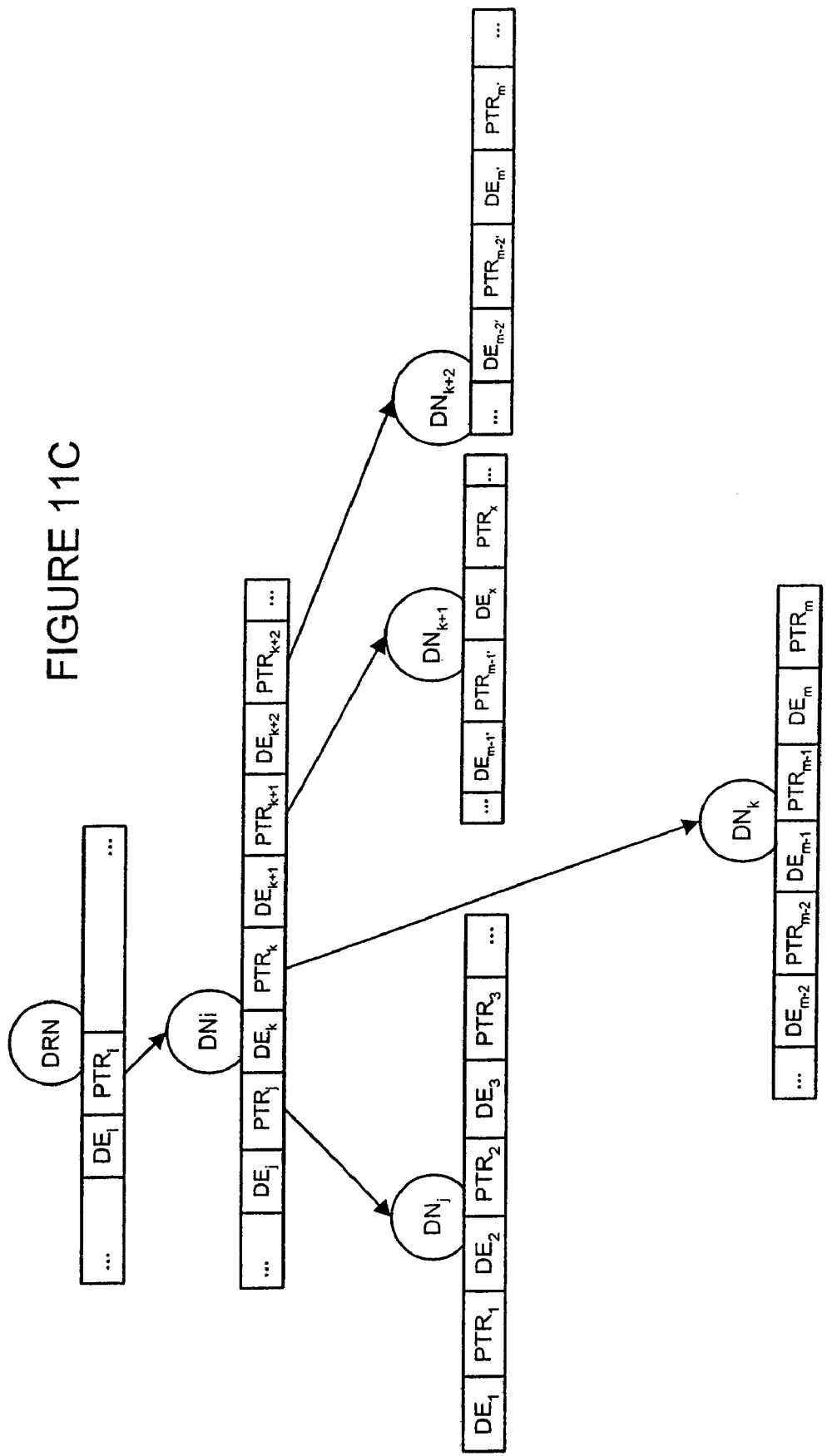
Figure 11D:
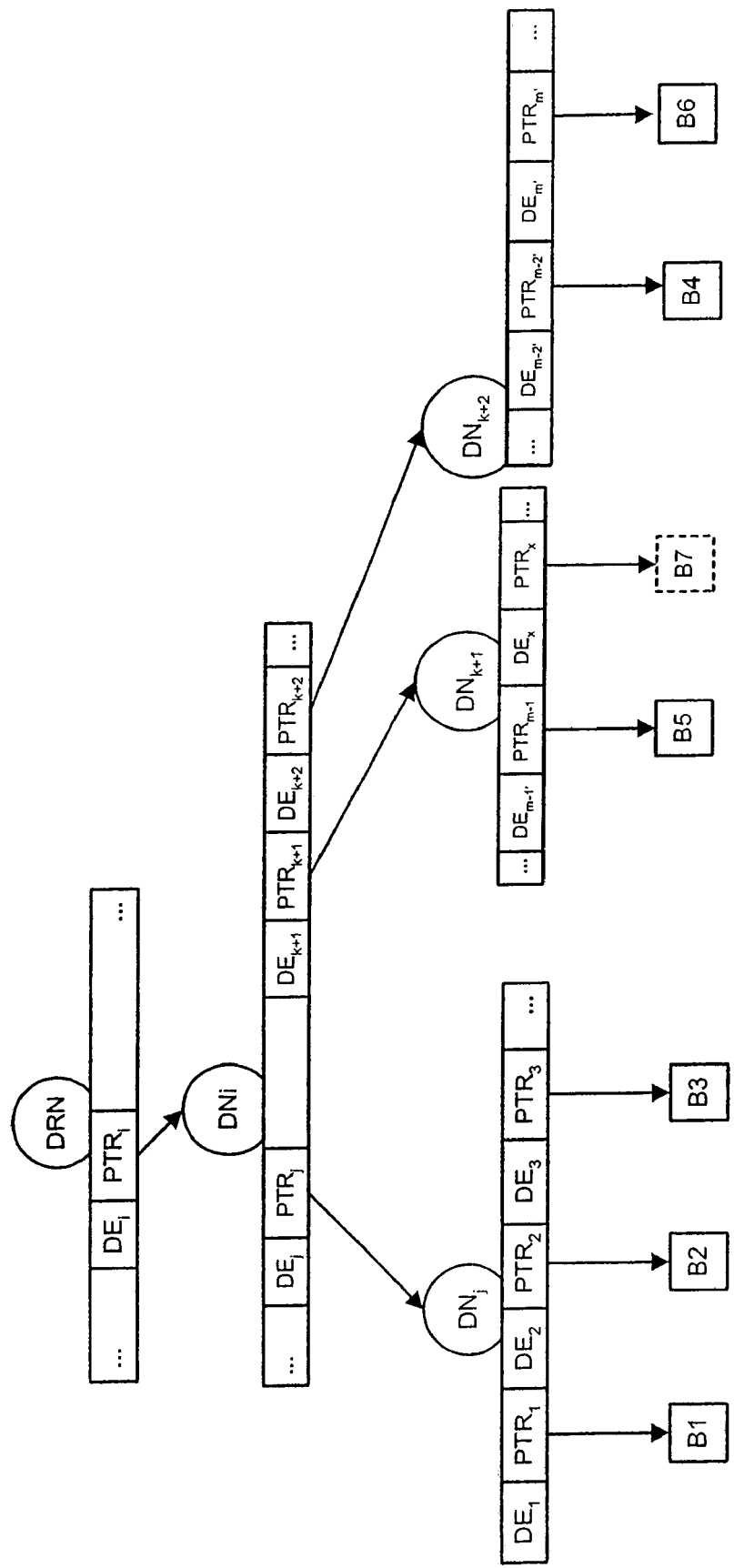

FIG. 11A illustrates a (e.g., balanced) tree directory data structure with directory block (nodes) DN at the third level full—there is no room to add a directory entry (and pointer) associated with a new block. As shown in FIG. 11B, directory blocks (nodes) $DN_{k+1}$ and $DN_{k+2}$, which are siblings to directory block (node) $DN_k$, are added. Then, as shown in FIG. 11C, the contents (e.g., the directory entries (DEs) and the pointers (PTRs)) of full directory block (node) $DN_k$, as well as new directory entry $(DE_X)$ and/or pointer $(PNTR_X)$ associated with the new (system) block, are copied into new directory blocks (nodes) $DN_{k+1}$ and $DN_{k+2}$. Only after such writes have been successfully completed, are the directory block (node) $DN_k$, and its entries deleted as shown in FIG. 1D. Such writes are indicated by the directory blocks (nodes) written to the secondary storage 1690 in communications 1606. The write(s) used to update the data structure may be confirmed by the atomic write operation(s) 430a, as indicated by 1608. The success of the write may be acknowledged to the atomic data structure alteration operation(s) 420a and/or the new block write operation(s) 420a as indicated by communications 1610 and 1612, respectively. In response, the new block write operation(s) 410a may then write the (system) block to the secondary storage, via the atomic write operation (s) 430a, as indicated by communications 1614 and 1616. The success of the write may be acknowledged as indicated by 1618 and communication 1620. (Recall, e.g., 430a' of FIG. 6.)

Also, as shown by communication 1622, the first file server may request or instruct a second file server to write a backup duplicate of the (system) block. (Recall, e.g., 430b' of FIG. 6.) Recall that this second file server (and/or a segment of its secondary storage 1695) may be determined from information in the superblock of the secondary storage 1690 of the first file server. At the second file server, an atomic write operation(s) 430b may write the backup duplicate of the (system) block to its secondary storage 1695 as indicated by communication 1624. The success of the write may be determined as indicated by 1626, and acknowledged back to the first file server as indicated by communication 1628.

At this point, the original copy of the (system) block has been written to the secondary storage 1690 of the first file server, and the backup duplicate of the (system) block has been written to the secondary storage 1695 of the second file server. Later, suppose that a (system) block needs to be modified. An example illustrating one way to perform such a block modification is illustrated below the stippling of FIG. 16. As indicated by communication 1650, a modify operation(s) 440a may issue a modify block request to an atomic write operation(s) 430 (Recall, e.g., 1020 of FIG. 10.) which, in turn, writes the block to the secondary storage 1690 of the first file server, as indicated by communication 1652. If the write was successful, as indicated by check 1654, the atomic write operation(s) 430a may return an appropriate acknowledge as indicated by communication 1656. In addition, as indicated by communication 1658, the modify operation(s) 440a may submit a command or request to modify the backup duplicate of the (system) block. (Recall, e.g., 1030 of FIG. 10.) In such a case, the atomic write operation(s) 430b of the second file server may be used to write the modified system block as indicated by communication 1660. If the write was successful, as indicated by check 1662, the atomic write operation(s) 430b of the second file server may return an appropriate acknowledge to the modify operation(s) 440a of the first server, as indicated by communication 1664.

In the foregoing examples, although not shown, when a block is modified, if the write was successful, the old block (s), if any, may be released. (Recall, e.g., 780 of FIGS. 7 and 880 of FIG. 8.) Also, in the event that a (system) block is deleted, note that the directory data structure (e.g., balanced tree) of the file system may merge directory blocks (nodes) as described in § 4.3.2 above.

Figure 17:
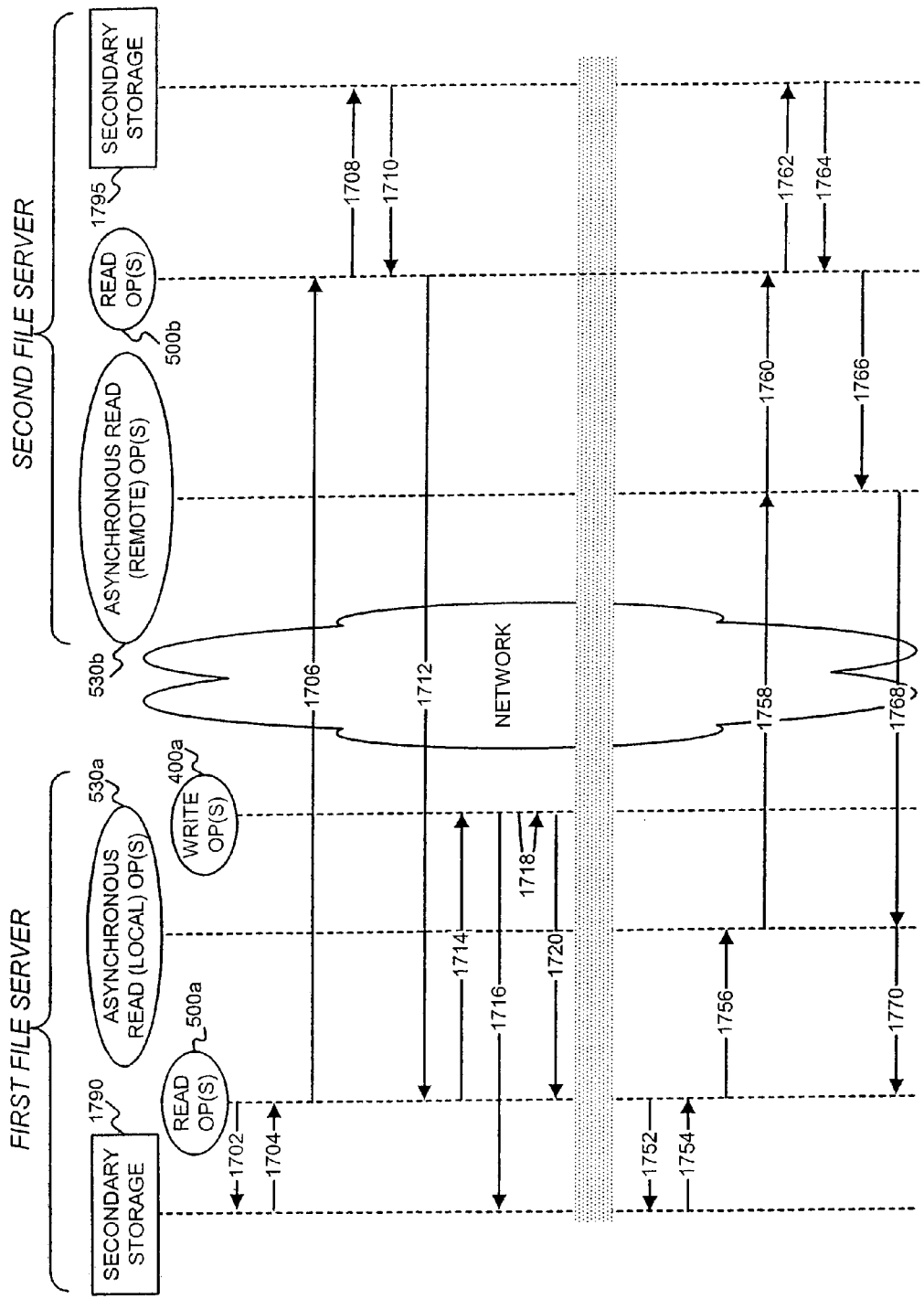
FIG. 17 is a messaging diagram that illustrates examples of reading a system block.

FIG. 17 is a messaging diagram that illustrates examples of reading a (system) block. In the first example, a read operation(s) 500a requests a block from the secondary storage 1790 which is returned, as indicated by communications 1702 and 1704. Assume that the block is invalid (e.g., bad checksum and/or stamp mismatch). (Recall, e.g., 1210 of FIG. 12.) In such a case, the read operation(s) 550a may submit a request for a backup duplicate to the read operation(s) 500b of a second file server, as indicated by communication 1706. (Recall, e.g., 1220 of FIG. 12.) Recall that this second file server (and/or a segment of its secondary storage 1795) may be determined from information in the superblock of the secondary storage 1790 of the first file server.

At the second file server, the read operation(s) 500*b* may read a backup duplicate of the invalid block, as indicated by communications 1708 and 1710. Assuming that the backup duplicate of the block is valid, it can then be provided back to the read operation(s) 550*a* of the first file server as indicated by communication 1712.

At the first file server, the read operation(s) 500*a* will want to replace the invalid block with its valid backup duplicate. More specifically, it 500*a* may request that a write operation(s) 400*a* write the backup duplicate on to the secondary storage 1790 of the first file server, as indicated by communication 1714. The write operation(s) 400*a* may then write the block to the secondary storage 1790, check its validity, and report its write back to the read operation(s) 500*a* as indicated by communication 1716, check 1718, and communication 1720. The backup duplicate of the desired block would also be returned to the client that requested it.

In the second example, set forth below the stippling of FIG. 17, a read operation(s) 500*a* reads a block from the secondary storage 1790 as indicated by communications 1752 and 1754. In this case, it is assumed that the block is valid. The read operation(s) 500*a* may then request that an asynchronous read operation 530*a* invoke a validity check of any backup duplicates of the file just read, as indicated by communication 1756. (Recall, e.g., 1250 of FIG. 12.)

The asynchronous read operation(s) 530*a* local to the first file server will then communicate a validity check request to the remote asynchronous read operation(s) 530*b* at the second file server, as indicated by communication 1758. (Recall, e.g., FIG. 13.) Recall that this second file server (and/or a segment of its secondary storage 1695) may be determined from information in the superblock of the secondary storage 1790 of the first file server. At the second file server, the asynchronous read operation(s) 530*b* can request a validity check by the read operation(s) 500*b*, as indicated by communication 1760. The read operation(s) 500*b* may then read the backup duplicate of the block from the secondary storage 1795 of the second file server, as indicated by communications 1762 and 1764. The read operation(s) 500*b* may then forward a reply, which indicates whether or not the backup duplicate is valid, to the asynchronous read operation(s) 530*b*, as indicated by communication 1766. The asynchronous read operation(s) 530*b* of the second file server may then forward the status of the backup duplicate to the asynchronous read operation(s) 530*a* of the first file server, as indicated by communication 1768. (Recall 1430 of FIG. 14.) At the first file server, the asynchronous read operation(s) 530*a* may forward such status information to the read operation(s) 500*a* as indicated by communication 1770.

Although the asynchronous (or lazy) read operations were shown as being invoked by a file read, they can be invoked by another event, or periodically.

§ 4.5 CONCLUSIONS

As can be appreciated from the foregoing, by making updates to the file system atomic in nature, such that such updates can be discarded if not properly completed, the present invention guarantees file system integrity. For example, since writes of (system) blocks are atomic in nature, at any given time, there will be a valid copy or backup duplicate of the (system) blocks. The validity of the backup duplicate(s) of a system block may be checked (e.g., using checksums and/or stamps) from time to time, such as when a read of the original (primary copy of the) system block occurs. Further, since any changes to the file system directory data structures are atomic in nature, such a data structure may grow and shrink without jeopardizing the consistency of the file system. Since the file system remains coherent, recovery processes aren't needed.

What is claimed is:

1. In a distributed file system in which a block of data is stored on a first non-volatile storage and a backup duplicate of the block of data is stored on a second non-volatile storage, a method for reading the block of data from the first non-volatile storage, the method comprising:
   a) determining whether the block of data is valid;
   b) in response to determining that the block of data is not valid:
      i) determining whether the backup duplicate of the block of data is valid, and
      ii) in response to determining that the backup duplicate of the block is valid, using the backup duplicate of the block of data to rewrite the block of data to the first non-volatile storage medium; and
   c) in response to determining that the block of data is valid, checking the validity of the backup duplicate of the block of data;
   wherein the block of data is stored in a first particular part of the first non-volatile storage, and
   wherein the validity of the backup duplicate in the second non-volatile storage is determined using a mapping, in a partition control block of the first non-volatile storage, of the first particular part of the first non-volatile storage to a second particular part of the second non-volatile storage for storing backup duplicates of blocks of data stored in the first particular part of the first non-volatile storage.

2. The method of claim 1 wherein the act of checking the validity of the backup duplicate of the block of data is done asynchronously.

3. The method of claim 1 wherein the act of determining whether the block is valid includes checking a checksum value of the block.

4. The method of claim 1 wherein the act of determining whether the block is valid includes comparing a first stamp at a beginning of the block with a second stamp at an end of the block.

5. The method of claim 4 wherein the second stamp is a predetermined function of the first stamp, and
   wherein the act of determining whether the block is valid includes determining whether or not the second stamp is the predetermined function of the first stamp.

6. The method of claim 4 wherein at least one of the first and second stamps is a 64-bit number.

7. The method of claim 1 wherein the first non-volatile storage is part of a first file server and wherein the second non-volatile storage is part of a second file server.

8. The method of claim 7 wherein the first file server is remote from the second file server.

9. A machine readable storage medium having machine readable instructions, the machine readable instructions, when executed by a machine, effecting a method for use in a distributed file system in which a block of data is stored on a first non-volatile storage and a backup duplicate of the block of data is stored on a second non-volatile storage, for reading the block of data from the first non-volatile storage, the method comprising:
   a) determining whether the block of data is valid;
   b) in response to determining that the block of data is not valid:
      i) determining whether the backup duplicate of the block of data is valid, and ii) in response to determining that the backup duplicate of the block is valid, using the backup duplicate of the block of data to rewrite the block of data to the first non-volatile storage medium;

c) in response to determining that the block of data is valid, checking the validity of the backup, duplicate of the block of data;

wherein the block of data is stored in a first particular part of the first non-volatile storage, and wherein the validity of the backup duplicate in the second non-volatile storage is determined using a mapping, in a partition control block of the first non-volatile storage, of the first particular part of the first non-volatile storage to a second particular part of the second non-volatile storage for storing backup duplicates of blocks of data stored in the first particular part of the first non-volatile storage.

10. The machine readable medium of claim 9 wherein the act of checking the validity of the backup duplicate of the block of data is done asynchronously.

11. The machine readable medium of claim 9 wherein the act of determining whether the block is valid includes checking a checksum value of the block.

12. The machine readable medium of claim 9 wherein the act of determining whether the block is valid includes comparing a first stamp at a beginning of the block with a second stamp at an end of the block.

13. The machine readable medium of claim 12 wherein the second stamp is a predetermined function of the first stamp, and
wherein the act of determining whether the block is valid includes determining whether or not the second stamp is the predetermined function of the first stamp.

14. The machine readable medium of claim 12 wherein at least one of the first and second stamps is a 64-bit number.

15. The machine readable medium of claim 9 wherein the first non-volatile storage is part of a first file server and wherein the second non-volatile storage is part of a second file server.

16. A file server for use in a distributed file system in which a block of data is stored on a first non-volatile storage of the file server, and in which a backup duplicate of the block of data is stored on a second non-volatile storage of another file server, the file server comprising:

a) the first non-volatile storage; and
b) a processor for reading a block of data from the first non-volatile storage, the processor being adapted for
   i) determining whether the block of data is valid;
   ii) in response to determining that the block of data is not valid:
      A) determining that the backup duplicate of the block of data is valid, and
      B) in response to determining that the backup duplicate of the block is valid, using the backup duplicate of the block of data to rewrite the block of data to the first non-volatile storage medium;
   iii) in response to determining that the block of data is valid, checking the validity of the backup duplicate of the block of data;

wherein the block of data is stored in a first particular part of the first non-volatile storage, and wherein the validity of the backup duplicate in the second non-volatile storage is determined using a mapping, in a partition control block of the first non-volatile storage, of the first particular part of the first non-volatile storage to a second particular part of the second non-volatile storage for storing backup duplicates of blocks of data stored in the first particular part of the first non-volatile storage.

17. The file server of claim 16 wherein the processor checks the validity of the backup duplicate of the block of data asynchronously.

18. The file server of claim 16 wherein the block of data includes a checksum value, and wherein the act of determining whether the block is valid includes checking the checksum value of the block of data.

19. The file server of claim 16 wherein the block of data includes a first stamp at its beginning and a second stamp at its end, and wherein act of determining whether the block is valid includes comparing the first stamp with the second stamp.

20. The file server of claim 19 wherein the second stamp is a predetermined function of the first stamp, and
wherein the act of determining whether the block is valid includes determining whether or not the second stamp is the predetermined function of the first stamp.

21. The file server of claim 19 wherein at least one of the first and second stamps is a 64-bit number.

* * * * *